US008989887B2

(12) United States Patent
Stafford et al.

(10) Patent No.: US 8,989,887 B2
(45) Date of Patent: Mar. 24, 2015

(54) USE OF PREDICTION DATA IN MONITORING ACTUAL PRODUCTION TARGETS

(75) Inventors: Richard Stafford, Bountiful, UT (US); David E. Norman, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 456 days.

(21) Appl. No.: 12/703,711

(22) Filed: Feb. 10, 2010

(65) Prior Publication Data

US 2010/0228376 A1 Sep. 9, 2010

Related U.S. Application Data

(60) Provisional application No. 61/151,681, filed on Feb. 11, 2009.

(51) Int. Cl.
| | |
|---|---|
| G06F 7/38 | (2006.01) |
| G06N 3/02 | (2006.01) |
| G06F 19/00 | (2011.01) |
| G06Q 10/04 | (2012.01) |
| G06Q 10/06 | (2012.01) |
| G06F 15/00 | (2006.01) |
| G06F 9/455 | (2006.01) |
| G06F 7/00 | (2006.01) |

(52) U.S. Cl.
CPC .............. *G06Q 10/04* (2013.01); *G06Q 10/06* (2013.01)
USPC .............. 700/108; 700/219; 706/21; 703/22; 708/553; 712/239

(58) Field of Classification Search
USPC ............. 700/219; 712/239; 703/22; 708/553; 706/21
See application file for complete search history.

(56) References Cited

U.S. PATENT DOCUMENTS

| | | | | |
|---|---|---|---|---|
| 3,850,105 | A | * 11/1974 | Aronstein et al. | ............. 104/307 |
| 4,062,102 | A | * 12/1977 | Lawrence et al. | ................. 438/4 |
| 5,155,573 | A | 10/1992 | Abe et al. | |
| 5,311,438 | A | * 5/1994 | Sellers et al. | ................... 700/96 |

(Continued)

FOREIGN PATENT DOCUMENTS

| | | |
|---|---|---|
| JP | 06-347379 | 12/1994 |
| JP | 3147586 | 3/2001 |

(Continued)

OTHER PUBLICATIONS

Ogawa et al., "Development of Sequential Prediction System for Large Scale Database-Based Online Modeling", IEEE, 2007, 4pg.*
PCT/US2010/023942 PCT Search Report mailed Oct. 12, 2010, 6 pages.
PCT/US2010/023942 PCT Written Opinion mailed Oct. 12, 2010, 6 pages.

(Continued)

*Primary Examiner* — Robert Fennema
*Assistant Examiner* — Thomas Stevens
(74) *Attorney, Agent, or Firm* — Blakely, Sokoloff, Taylor & Zafman LLP

(57) ABSTRACT

A method and system for the use of prediction data in monitoring actual production targets is described herein. In one embodiment, a process is provided to receive data from a plurality of source systems in a manufacturing facility and generate a prediction pertaining to a future state of the manufacturing facility based on the data received from the plurality of source systems. A recent state of the manufacturing facility is determined based on the data received from the plurality of source systems and a comparison between the recent state and the prediction is facilitated.

19 Claims, 20 Drawing Sheets

(56) References Cited

U.S. PATENT DOCUMENTS

| | | | |
|---|---|---|---|
| 5,311,562 A | 5/1994 | Palusamy et al. | |
| 5,375,061 A * | 12/1994 | Hara et al. | 700/101 |
| 5,377,308 A * | 12/1994 | Inoue et al. | 706/52 |
| 5,402,367 A | 3/1995 | Sullivan et al. | |
| 5,442,562 A | 8/1995 | Hopkins et al. | |
| 5,544,308 A | 8/1996 | Giordano et al. | |
| 5,623,109 A | 4/1997 | Uchida et al. | |
| 5,654,896 A | 8/1997 | Ochi | |
| 5,694,401 A | 12/1997 | Gibson | |
| 5,719,796 A * | 2/1998 | Chen | 703/13 |
| 5,971,585 A * | 10/1999 | Dangat et al. | 700/102 |
| 6,038,540 A * | 3/2000 | Krist et al. | 705/7.33 |
| 6,088,676 A * | 7/2000 | White, Jr. | 705/7.39 |
| 6,202,181 B1 | 3/2001 | Ferguson et al. | |
| 6,370,437 B1 * | 4/2002 | Carter et al. | 700/52 |
| 6,421,571 B1 | 7/2002 | Spriggs et al. | |
| 6,546,300 B1 * | 4/2003 | Fukuda et al. | 700/100 |
| 6,546,523 B1 * | 4/2003 | Boorananut et al. | 716/56 |
| 6,560,736 B2 | 5/2003 | Ferguson et al. | |
| 6,591,232 B1 * | 7/2003 | Kassapoglou | 703/2 |
| 6,625,688 B1 | 9/2003 | Fruehling et al. | |
| 6,678,569 B2 | 1/2004 | Bunkofske et al. | |
| 6,707,936 B1 | 3/2004 | Winter et al. | |
| 6,731,990 B1 * | 5/2004 | Carter et al. | 700/52 |
| 6,775,576 B2 | 8/2004 | Spriggs et al. | |
| 6,775,819 B1 | 8/2004 | Hardikar et al. | |
| 6,868,342 B2 | 3/2005 | Mutter | |
| 6,889,096 B2 | 5/2005 | Spriggs et al. | |
| 6,907,545 B2 | 6/2005 | Ramadei et al. | |
| 6,952,688 B1 * | 10/2005 | Goldman et al. | 706/45 |
| 6,954,883 B1 | 10/2005 | Coss, Jr. et al. | |
| 6,954,884 B2 | 10/2005 | Dean et al. | |
| 7,062,411 B2 | 6/2006 | Hopkins et al. | |
| 7,072,794 B2 | 7/2006 | Wittkowski | |
| 7,079,677 B2 | 7/2006 | Tai et al. | |
| 7,089,154 B2 * | 8/2006 | Rasmussen et al. | 702/183 |
| 7,099,815 B2 * | 8/2006 | Christodoulou et al. | 703/21 |
| 7,151,976 B2 | 12/2006 | Lin | |
| 7,169,625 B2 | 1/2007 | Davis et al. | |
| 7,349,753 B2 * | 3/2008 | Paik | 700/110 |
| 7,355,693 B2 | 4/2008 | Takeda et al. | |
| 7,380,213 B2 * | 5/2008 | Pokorny et al. | 715/764 |
| 7,413,546 B2 | 8/2008 | Agutter et al. | |
| 7,477,958 B2 * | 1/2009 | Burda et al. | 700/102 |
| 7,587,296 B2 | 9/2009 | Harvey, Jr. et al. | |
| 7,596,718 B2 | 9/2009 | Harvey, Jr. et al. | |
| 7,765,020 B2 | 7/2010 | Lin et al. | |
| 7,974,723 B2 * | 7/2011 | Moyne et al. | 700/101 |
| 8,010,321 B2 | 8/2011 | Lin et al. | |
| 8,214,308 B2 * | 7/2012 | Chu | 706/14 |
| 8,244,498 B2 * | 8/2012 | Wold et al. | 702/179 |
| 2002/0107813 A1 * | 8/2002 | Kanatani et al. | 705/64 |
| 2002/0133444 A1 * | 9/2002 | Sankaran et al. | 705/36 |
| 2002/0143472 A1 | 10/2002 | Mutter | |
| 2003/0004969 A1 * | 1/2003 | Park et al. | 707/104.1 |
| 2003/0005486 A1 | 1/2003 | Ridolfo et al. | |
| 2003/0018616 A1 * | 1/2003 | Wilbanks et al. | 707/2 |
| 2003/0100131 A1 | 5/2003 | Fang et al. | |
| 2003/0109951 A1 | 6/2003 | Hsiung et al. | |
| 2003/0171897 A1 | 9/2003 | Bieda et al. | |
| 2003/0225466 A1 | 12/2003 | Yulevitch et al. | |
| 2003/0233287 A1 * | 12/2003 | Sadler et al. | 705/28 |
| 2004/0002842 A1 | 1/2004 | Woessner et al. | |
| 2004/0024543 A1 | 2/2004 | Zhang et al. | |
| 2004/0110310 A1 | 6/2004 | Sun et al. | |
| 2004/0189717 A1 | 9/2004 | Conally et al. | |
| 2004/0210850 A1 | 10/2004 | Bermudez et al. | |
| 2004/0254762 A1 | 12/2004 | Hopkins et al. | |
| 2005/0010117 A1 | 1/2005 | Agutter et al. | |
| 2005/0033464 A1 * | 2/2005 | Nguyen | 700/108 |
| 2005/0033527 A1 | 2/2005 | Wada et al. | |
| 2005/0033734 A1 * | 2/2005 | Chess et al. | 707/3 |
| 2005/0060103 A1 | 3/2005 | Chamness | |
| 2005/0114023 A1 | 5/2005 | Williamson et al. | |
| 2005/0114743 A1 | 5/2005 | Moorhouse | |
| 2005/0221596 A1 | 10/2005 | You et al. | |
| 2005/0234684 A1 * | 10/2005 | Sawicki et al. | 703/1 |
| 2006/0106473 A1 * | 5/2006 | Enright et al. | 700/96 |
| 2006/0111804 A1 | 5/2006 | Lin | |
| 2006/0149990 A1 | 7/2006 | Willis et al. | |
| 2006/0265185 A1 * | 11/2006 | Lanzerotti et al. | 702/181 |
| 2007/0006037 A1 | 1/2007 | Sargusingh et al. | |
| 2007/0021859 A1 | 1/2007 | Lev-Ami et al. | |
| 2007/0028220 A1 | 2/2007 | Miller et al. | |
| 2007/0038418 A1 | 2/2007 | Ahn et al. | |
| 2007/0067678 A1 | 3/2007 | Hosek et al. | |
| 2007/0179652 A1 * | 8/2007 | Weigang et al. | 700/100 |
| 2007/0192064 A1 | 8/2007 | Nakamura et al. | |
| 2007/0192128 A1 * | 8/2007 | Celestini | 705/1 |
| 2008/0082197 A1 * | 4/2008 | Lacaille | 700/121 |
| 2008/0183444 A1 * | 7/2008 | Grichnik et al. | 703/2 |
| 2008/0195241 A1 | 8/2008 | Lin et al. | |
| 2008/0229318 A1 | 9/2008 | Franke | |
| 2008/0276137 A1 | 11/2008 | Lin et al. | |
| 2009/0118842 A1 * | 5/2009 | Norman et al. | 700/44 |
| 2009/0118856 A1 * | 5/2009 | Nakagawa et al. | 700/108 |
| 2009/0119077 A1 * | 5/2009 | Norman et al. | 703/6 |
| 2009/0228129 A1 * | 9/2009 | Moyne et al. | 700/102 |
| 2009/0287339 A1 | 11/2009 | Shimshi | |
| 2010/0076729 A1 * | 3/2010 | Davis et al. | 702/184 |
| 2010/0087941 A1 | 4/2010 | Assaf et al. | |
| 2010/0199285 A1 * | 8/2010 | Medovich | 718/104 |
| 2011/0035037 A1 * | 2/2011 | Weber et al. | 700/96 |

FOREIGN PATENT DOCUMENTS

| | | |
|---|---|---|
| KR | 10-2004-0004664 | 1/2004 |
| TW | 1254248 | 5/2006 |
| WO | WO-2009/143031 | 11/2009 |
| WO | WO-2010/093821 | 8/2010 |

OTHER PUBLICATIONS

International Preliminary Report on Patentability for PCT/US2009/044243, mailed Nov. 23, 2010, 6 pages.

Written Opinion of the International Searching Authority for Application No. PCT/US2009/044243, mailed Dec. 28, 2009, 5 pages.

International Search Report for Application No. PCT/US2009/044243, mailed Dec. 29, 2009, 3 pages.

International Preliminary Report on Patentability for Application No. PCT/US2010/023942, Aug. 16, 2011, 7 pages.

"Introduction to the SEMI 300mm Standards", Revision C, Aug. 26, 2003, pp. 1-8, Cimetrix Incorporated, Salt Lake City, Utah.

"SEMI E30.5-0302 Specification for Metrology Specific Equipment Model", www.semi.org, Dec. 2001, pp. 1-33.

"SEMI E40-0705 Standard for Processing Management", www.semi.org, Jun. 2005, pp. 1-25.

"SEMI E94.1-1101 Specification for SECS-II Protocol for Control Job Management (CJM)", www.semi.org, Sep. 2001, pp. 1-6.

"SEMI E94-0302 Provisional Specification for Control Job Management", www.semi.org, Dec. 2001, pp. 1-21.

Moyne, James, "Glossary of SEMI Standards: Current and Pending", Nov. 1998, University of Michigan, MiTeX Solutions, Inc., http://www.integratedmeasurement.org/standards/stand03.htm, pp. 1-3.

Office Action with English translation received from the Korean Intellectual Property Office, dated Nov. 13, 2012, for corresponding Korean Patent Application No. 10-2011-7021140, 12 pages.

Office Action (english translation) received from the Korean Intellectual Property Office, for corresponding Korean Patent Application No. 10-2011-7021140—dated Jun. 18, 2013, 4 pages.

Office Action (english translation) received from the Korean Intellectual Property Office, for corresponding Korean Patent Application No. 10-2011-7021140—dated Aug. 8, 2013, 6 pages.

Taiwan Search Report (english translation) received from the Taiwan Intellectual Property Office, for corresponding Taiwan Patent Application No. 098116602—dated Jun. 5, 2013, 1 page.

Eric D. Boskin, et al., "A Method for Modeling the Manufacturability of IC Designs", IEEE Transactions on Semiconductor Manufacturing, vol. 7, No. 3, Aug. 1994, 8 pages.

* cited by examiner

| LOT | PART | PREDICTED STEP | PREDICTED TIME |
|---|---|---|---|
| RS564036 | TX20271.1 | 305 | 8/31/2007 0:00 |
| RS568031 | TX20271.1 | 60 | 8/31/2007 0:00 |

FIG. 3

Data for Schema

| Name | Description |
|---|---|
| AlternateStep | Alternate steps MUST be supported by the scheduler. This table defines the places where alternates occur in the factory. The schedule can use alternates as alternatives to the base path processing. The primary |
| Attach | The attach table, attaches calendars to resources. This works for operators, genres, and stations. The ToaDate identifies the first calendar event. The calendar attach table schema is comprised of these fields (list |
| Calendar | The calendar provides a way to create action events in the scheduler. The calendar table schema is comprised of these fields (listed in alphabetical order). |
| Carrier | The carrier definition file identifies the location and state of the carrier for prediction and scheduling models. The carrier table schema is comprised of these fields (listed in alphabetical order). |
| CounterGroup | The counter group table schema is comprised of these fields (listed in alphabetical order). |
| EquipmentGroup | An equipment grouping file provides support for the User Interface applications in showing groups of stations together. The equipment group table schema is comprised of these fields (listed in alphabetical ord |
| ExceptionCalendar | An exception calendar provides a calendar that can force the state of an equipment during some specific calendar time. This might be use in a factory to put the tool in a maintenance state or manual processing |
| FromTo | From to table defines how long transport will happen between two locations. Locations are assigned to stations, load ports and stockers. The scheduler has a retrieval time, time to pick up from the source and a |
| Furnace | This table is used to detail furnace operations for detailed equipment modeling of furnaces. Each entry details a unique process, certification, station and reactor. The furnace table schema is comprised of these f |
| GateStep | GateStep provides definitions for time restrictions between two steps. For alternatives steps this definition would need to be defined for each step. This is because the duration may differ alternatives which exist |
| Genres | The generic resource table identifies the generic resource definitions and the current state of the resource. The procEff and setupEff are efficiency times for this resource. If this generic resource is claimed by a |
| LoadPort | This table defines the load ports and load port current states. The load port table schema is comprised of these fields (listed in alphabetical order). |
| LotFutureHold | This table defines lot future holds. The lot future hold table schema is comprised of these fields (listed in alphabetical order). |
| LotFutureMerge | This table defines lot future merges. The lot future hold table schema is comprised of these fields (listed in alphabetical order). |
| LotFutureReposition | This table defines lot future repositions. The lot future hold table schema is comprised of these fields (listed in alphabetical order). |
| LotFutureSampling | This table defines lot future sampling requirements. The lot future hold table schema is comprised of these fields (listed in alphabetical order). |
| LotFutureSplit | This table defines lot future splits. The lot future split table schema is comprised of these fields (listed in alphabetical order). |
| LotGateStep | This table defines lots that are currently in a gate step. The lot gate step table schema is comprised of these fields (listed in alphabetical order). |
| LotResource | This table identifies resources, operators and generic resources, that are claimed by a lot. The lot resource table schema is comprised of these fields (listed in alphabetical order). |
| LotStateHistory | The lot state history table records the history events that occur for lots. The data collected are step, batched, station, substation, start, reserved, trackin, trackout and time finished. The lot state history table sch |
| LotStepStationDedication | The lot step station dedication table identifies future steps that have station dedications for a lot. The lot step station dedication table schema is comprised of these fields (listed in alphabetical order). |
| LotStepStationException | The lot step station exceptions table identifies future steps that have station exceptions for a lot. The lot step station exception table schema is comprised of these fields (listed in alphabetical order). |
| MoveTarget | The move target table provides a way to identify production targets for a step or group of steps. This is typically a metric used in an objective function. The move target table schema is comprised of these fields |
| Part | The product definition table schema is comprised of these fields (listed in alphabetical order). |
| Period | Periods are used to define operational periods for certain activities such as, lot start definitions in the starts file. The period definition table schema is comprised of these fields (listed in alphabetical order). |
| PMCalendar | This table defines recurring PM calendars based on calendar time. The mtbm defines the time between pm events and the mttr, defines the time to execute the pm. There is a startAtPM.Select, which if false, th |
| PMorder | The pmorder table identifies the pm orders that are actively known in the factory. The preventative maintenance order table schema is comprised of these fields (listed in alphabetical order). |
| Prediction | The prediction table identifies future lot arrivals. The data for the prediction table is generated from a prediction sever. The prediction table schema is comprised of these fields (listed in alphabetical order). |
| Process | Defines process timer overrides due as conditions such as what stations used what particular time processing ect. The process definition table schema is comprised of these fields (listed in alphabetical order). |
| ReserveCalendar | The reserve calendar definition table allows users to define a reservation period for a specific product or setup. The reserve calendar table schema is comprised of these fields (listed in alphabetical order). |
| ResourceCertification | The resource certification definition table defines certification assignments to stations, operators and resources. If a certification exists but the status is false, this resource can not process the work at this time. |
| ResourceStep | The resource step definition table is a generic table that supports all resources and operators. This table identifies what resource is needed at a step. The resource can be made a multi-step resource by having o |
| Reticle | The reticle table schema is comprised of these fields (listed in alphabetical order). |
| SampleStep | The sample step table identifies the current sampling assignments for stations. The sample step table schema is comprised of these fields (listed in alphabetical order). |
| Sampling | The sample definition table. The sampling table uses attributes to manage the current state of a sampling metric. Attribute types can be part, step, station or lot based. Attribute values are incremented each tim |
| Seasoning | The seasoning table identifies the current seasoning assignments for stations. The seasoning table schema is comprised of these fields (listed in alphabetical order). |
| SeasoningDefinition | The seasoning definition file identifies the current seasoning duration. The seasoning table schema is comprised of these fields (listed in alphabetical order). |
| Setup | The setup definition table provides the setup delays required to move a setup on an equipment from oursetup to newsetup. Setups can be part specific. The set table schema is comprised of these fields (listed |
| SetupGroup | The setup group table schema is comprised of these fields (listed in alphabetical order) |
| SetupOrder | The setup order file details when setups can occur. If station has an entry in this table, then only valid setup order entries are allowed. If the station does not have an entry in this table, then the scheduler has f |
| Start | This table defines when new parts will start. The period defines other timer intervals are created over the search Type identifiers |
| Station | The station table identifies stations and stations current state. The station table schema is comprised of these fields (listed in alphabetical order) |

FIG. 10A

Data for Schema
Schema: Name: Station Description: The Station table identifies stations and stations current state. The station table schema is comprised of these fields (listed in alphabetical order).
Columns:

| Name | Description | Type | Models |
|---|---|---|---|
| ID | The id for a Station | xs:string | Both |
| STNFAM | The name of the family to which a Station belongs. | xs:string | Both |
| STN | The name of the Station. | xs:string | Both |
| STNLOC | The location of the station. | xs:string | Both |
| BATCHPER | Whether BATCHMN/BATCHMX quantities are per "lot" or "piece" for the standard BATCHOK. | xs:string | Both |
| BATCHMN | The minimum quantity of lots required to make a batch. | xs:int | Both |
| BATCHMX | The maximum quantity of lots allowed in a batch. | xs:int | Both |
| WNLTIM | The maximum wait time for BATCHMX if BATCHMN has been met. | xs:duration | Both |
| MAXWNLTTM | The maximum wait time for BATCHMAN. | xs:duration | Both |
| STNCAP | The capacity of the station. | xs:int | Both |
| STNINTCAP | The internal capacity of the station. | xs:int | Both |
| PROCEFF | The processing efficiency for this station (0.0-1.0) | xs:double | Both |
| SETUPEFF | The setup efficiency for the station (0.0-1.0) | xs:double | Both |
| LTIME | The quantity of time the load takes. | xs:duration | Both |
| ULTIME | The quantity of time the unload takes. | xs:duration | Both |
| AVGQTIME | The average queue time for this station. | xs:duration | Both |
| AVGSETUP | The average setup time for this station. | xs:duration | Both |
| AVGTRANSIT | The average transit time for this station. | xs:duration | Both |
| CURSETUP | This station's current setup. | xs:string | Both |
| REMSETUP | The stations current remainder duration to complete an in-process setup. | xs:duration | Both |
| DOWN | A code denoting the current status of this station. Default is false. True if down. | xs:boolean | Both |
| DOWNUNT | Date Time STN will be up from current down. | xs:Date Time | Both |
| STNTYPE_ID | The name of the station type. | xs:string | Both |
| SUBRESCONFIG | The configuration defined in the station type subsource file. | xs:string | Both |
| SUBRESMODE | Indicates whether the multi-capacity station runs in parallel or cascade mode. | xs:string | Both |

USE OF PREDICTION DATA IN MONITORING ACTUAL PRODUCTION TARGETS

RELATED APPLICATION

This application is related to and claims the benefit of U.S. Provisional Patent application Ser. No. 61/151,681, filed Feb. 11, 2009, which is hereby incorporated by reference.

TECHNICAL FIELD

Embodiments of the present invention relate to manufacturing production environment analysis and more specifically to predicting and analyzing production operation status in a manufacturing facility.

BACKGROUND OF THE INVENTION

In an industrial manufacturing environment, accurate control of the manufacturing process is important. Ineffective process control can lead to costly processing delays due to automation issues or manual interfaces that were not correctly or effectively monitored. Without effective and efficient monitoring, an automated manufacturing facility may experience processing delays caused by a stalled lot or idle or stalled equipment. For example, a factory may have a high priority lot, i.e., a lot that should process without queue time, but due to a process error the high priority lot was left in a previous steps equipment buffer for an extended period of time. In one embodiment, the process error may be due to an automation error. As a result, the factory endured a stalled lot condition. In another example, a factory process may include manual operations to introduce new material into the factory. However, the new material starts may not have occurred because the manual start operation was not being performed.

Typically, production line control manually monitors manufacturing facilities in an isolated environment. The typical workflow for dealing with issues as described above, is that a production line control first identifies issues in a factory and subsequently builds watchdog applications to isolate specific issues. The difficulty with these implementations are many: cost of implementing the watchdogs, an issue must first be identified before the watchdog can be created, a manufacturing facility may possibly require a watchdog application for each issue amounting to hundreds of watchdogs, the cost of ownership and maintenance of these watchdog applications is high, and there may be many issues that are occurring in a factory that are never identified because no watchdog application was created.

BRIEF DESCRIPTION OF THE DRAWINGS

The present invention is illustrated by way of example, and not by way of limitation, in the figures of the accompanying drawings and in which:

FIG. 3 is an exemplary table generated of predicted output, in accordance with one embodiment of the invention;

FIG. 10A is an exemplary GUI of a data schema of an exemplary real time data model, in accordance with one embodiment of the invention;

FIG. 10B is an exemplary GUI of a data schema of an exemplary station data table, in accordance with one embodiment of the invention;

FIG. 10D is an exemplary GUI for defining a real time data model, in accordance with one embodiment of the invention.

DETAILED DESCRIPTION

Figure 1:
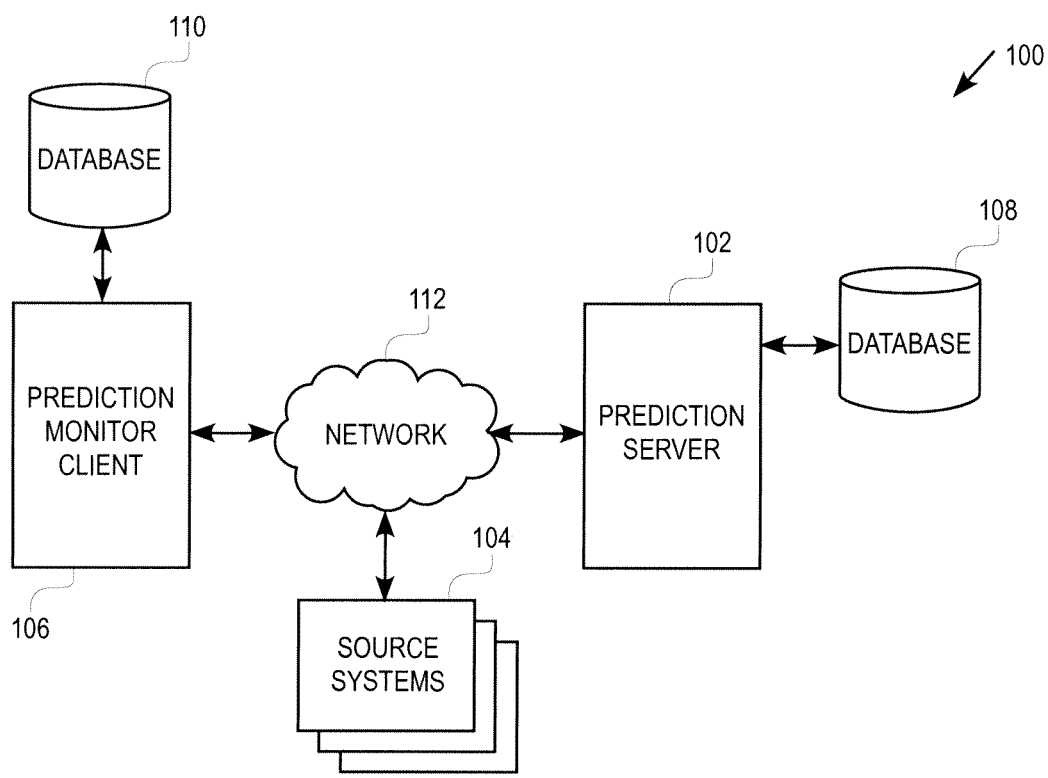
FIG. 1 illustrates an exemplary network architecture in which embodiments of the present invention may operate.

Embodiments of the invention provide a method and apparatus for monitoring actual production targets using predicted data. Given that a prediction of factory operations is accurate, a factory in normal operations should perform as defined in the prediction. Factory operations that deviate from the prediction may indicate that the factory operations are in error or that the prediction is invalid. In the case where factory operations are in error, production line control may be notified of the deviation and may further review the issue. In the case where the prediction is not accurate or is invalid, the prediction model may be corrected to prevent a false error. Embodiments of the invention apply comparative analysis to production system data to generate warnings and alarms, and to graphically present a comparison of predicted state of factory operations to an actual state of factory operations. As will be discussed in more detail below, notification and GUIs may be provided to alert production line control of a variance (deviation) between the actual production state and the predicted production state.

Embodiments of the invention may be used for an entire factory or in individual areas of a factory. Each component of the prediction model can be modeled at different levels of detail, depending on the level of accuracy required to mimic the actual operations or the importance of certain areas of the factory. Certain embodiments of the invention may connect multiple prediction models together to manage or model many areas of a factory or work area.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the method steps. The structure for a variety of these systems will appear from the description below. In addition, the present invention is not described with reference to any particular programming language. It will be appreciated that a variety of programming languages may be used to implement the teachings of embodiments of the invention as described herein.

A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 illustrates an exemplary network architecture 100 in which embodiments of the present invention may operate. The network architecture 100 may represent a manufacturing facility (e.g., a semiconductor fabrication facility) and may include a prediction server 102, a set of source systems 104, databases 108 and 110, and a prediction monitor client 106. The prediction server 102 may communicate with the source systems 104 and the prediction monitor client 106 via a network 112. The network may be a public network (e.g., Internet) or a private network (e.g., local area network (LAN)). Two or more of the facility systems may exist on the same machine and not communicate over the network, as they may use other communication protocols like shared memory, or operating system assisted facilities.

The source systems 104 may include, for example, Manufacturing Execution System (MES), Maintenance Management System (MMS), Material Control System (MCS), Equipment Control System (ECS), Inventory Control System (ICS), other Computer-integrated manufacturing (CIM) systems, various databases (including but not limited to flat-file storage systems such as Excel® files), etc. The source systems 104 may reside on different computers or at least some of the source systems 104 may reside on the same computer. One or more computers with one or more internal or external storage devices may host the prediction server 102.

The prediction server 102 builds predictions about the future of the manufacturing facility and its components. The prediction server 102 may start the prediction process at a scheduled time, or in response to a predetermined event or a request from a user. In one embodiment, the prediction server 102 performs incremental updates to the predictions in-between full prediction generations. The prediction server 102 may start the prediction update upon detecting a critical event (e.g., upon receiving a notification of a critical event from a source system 104).

The prediction server 102 builds predictions by collecting data from the source systems 104, generating predictions based on the collected data, and providing the predictions to the prediction monitor client 106. The data collected from the source systems 104 may include static data (e.g., equipment used by a source system, capability of different pieces of the equipment, etc.) and dynamic data (e.g., current state of equipment, what product is being currently processed by equipment of a source system, the characteristics of this product, etc.). The predictions generated by the prediction server 102 may specify, for example, a future state of the equipment in the manufacturing facility, the quantity and composition of the product that will be manufactured in the facility, the number of operators needed by the facility to manufacture this product, the estimated time a product will finish a given process operation and/or be available for processing at a given step, the estimated time a preventative maintenance operation should be performed on equipment, etc.

The prediction server 102 may use the dynamic data collected from the source systems 104 to generate the actual state of the manufacturing facility. The prediction server 102 may then facilitate a comparison between the actual state and the predicted state of the manufacturing facility. In some embodiments, the prediction server 102 facilitates a comparison between the recent state and the predicted state by determining whether a variance between the recent state and the predicted state exceeds a threshold, and providing a notification if the variance exceeds the threshold. The notification may include a warning or alarm to alert, for example, production line control, of variances between the actual state and the predicted state of the factory. The notification may also be provided via a GUI generated by the prediction server 102 and accessible to a user via a browser hosted by the client 106. In certain embodiments, the communication of the alert can be provided through a user interface, a mobile device, a voice system, email, a web client.

In other embodiments, the prediction server 102 facilitates a comparison between the recent state and the predicted state by providing the predicted state and the actual state to the prediction monitor client 106, which can then generate GUIs and reports illustrating the actual and predicted states of the manufacturing facility and indicating any existing variance between the actual and predicted states.

Figure 2A:
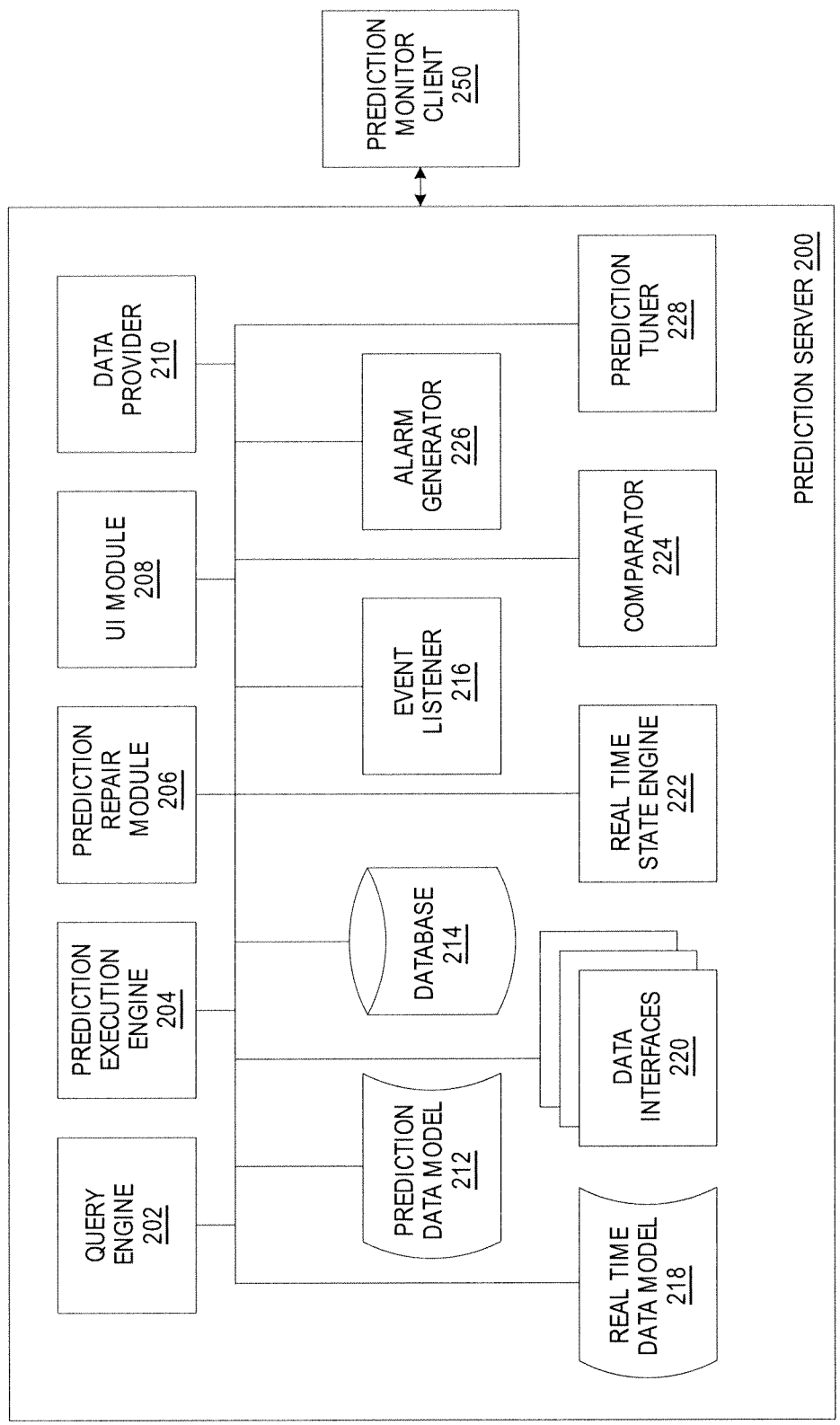
FIG. 2A is a block diagram of one embodiment of a prediction server.

FIG. 2A is a block diagram of one embodiment of a prediction server 200. The prediction server 200 may include a query engine 202, a prediction execution engine 204, a prediction repair module 206, a user interface (UI) module 208, a data provider 210, an event listener 216, a prediction data model 212, a prediction tuner 228, a database 214, a real time data model 218, data interfaces 220, a real time state engine 222, a comparator 224, and an alarm generator 226.

The prediction data model 212 defines which data and factory operation components (e.g., equipment, WIP (work in progress), products, product routes and operation steps) are needed to create predictions. The prediction model may be configurable via UI module 208 to include customer specific operations to help make the prediction monitoring system as accurate as possible. The query engine 202 submits queries to various source systems to obtain the data specified in the prediction data model 212. Upon receiving the query results from the source systems, the query engine 202 associates the received data with the prediction data model 212. The query engine 202 may communicate with various source systems via data interfaces 220. Data interfaces 220 may include a commercial database interface to receive data from commercial databases, an application interface to communicate with specific manufacturing automation products (e.g., Applied E3™ provided by Applied Materials® of Santa Clara, Calif.), web services to receive data from external applications, a data interface to perform simple data integration from text files, and a data interface to integrate data from tabular files (e.g., Excel® files). One example of a data interface is the Real-Time Dispatcher™ solution provided by Applied Materials® of Santa Clara, Calif.

The prediction execution engine 204 uses the prediction model 212 to generate predictions. In one embodiment, the prediction execution engine 204 calculates predictions using one or more formulas. For example, the prediction execution engine 204 may make calculations using information on the process equipment that can process a lot of material, the number of pieces in the lot, and the average process time per piece. In particular, the prediction execution engine 204 can calculate the amount of processing time on the equipment. In addition, if a lot started processing sometime in the past, the prediction execution engine 204 can estimate the completion time, by knowing when processing had started. In another example, prediction execution engine 204 may calculate the expected arrival time for a lot of material. In one embodiment, the prediction measurements are developed using a discrete event simulation or modeling technique. In this embodiment, by modeling the key resources and operations, estimates of start and complete time for operations can be generated. In an alternate embodiment, the prediction measurements are calculated using generation of estimators from historical data. In this embodiment, the use of historical data can be used to support the detailed operational prediction models, or can be used as an estimator for the predictions. In alternate embodiments, the prediction measurements are developed using different techniques without departing from the scope of the invention. The prediction engine has the ability to model the components of an operation in almost any level of detail.

In another embodiment, the prediction execution engine 204 runs simulation to generate predictions. Prediction execution engine 204 may estimate the time of future manufacturing activities (e.g., lot arrival times at future steps, future lot/equipment assignments, future lot/equipment operation completes, times for future preventative maintenance, lot start and complete times, equipment start and complete times, and equipment setup changes) by executing the prediction model forward a short time horizon. In particular, the prediction execution engine 204 initializes the prediction data model 212 with the current state of the facility and information about the equipment. The equipment behavior is then simulated step by step, synchronized in time, until reaching a specific point in the future. The duration of the short time horizon may be defined by input (e.g., user input) received via a UI module 208. Prediction execution engine 204 may also use a pre-determined duration. Each transition of the product and the equipment is recorded, with the final set of data representing prediction. In an example where the duration is a 10 hour period, prediction execution engine 204 may calculate the expected lot arrivals at future steps occurring in the next 10 hours. In yet other embodiments, the prediction execution module 204 can generate predictions using forecasting, statistical prediction, trend analysis, or other mechanisms.

The prediction execution module 204 stores the resulting predictions in the database 214. The database 214 may represent any type of data storage including, for example, relational or hierarchical databases, flat files, application or shared memory, etc. The database 214 may reside on a data storage device that may consist of one or more types of removable storage and/or one or more types of non-removal storage. The data provider 210 retrieves predictions from the prediction database 214 and sends them to comparator 224. The data provider 210 may also retrieve predictions from the database 214 and send them to a prediction monitor client 250. In one embodiment, the data provider 210 sends predictions upon receiving a prediction request from a prediction monitor client 250.

The event listener 216 is responsible for sensing a trigger of the prediction operations and real time observations of the prediction server 200. Such a trigger may be, for example, a user request to start the operations, a scheduled time, or a critical event occurred in the manufacturing facility.

The real time state engine 222 gathers real time data of the factory operations to generate the real time state of the factory. Real time state engine 222 may gather real time data automatically for every factory operation and may use real time data feeds from any factory event. Alternatively, event listener 216 may direct real time state engine 222 to obtain real time data upon sensing a trigger. In one embodiment, the latency for gathering the actual data is minimized. The real time state engine 222 may use query engine 202 to receive data from the source systems to populate real time data model 218. The real time state engine 222 uses the real time data model 218 to determine the actual state of the factory. The actual state, or recent state, as referred to herein is the state determined based on characteristics and events that are occurring or have occurred in a manufacturing facility. The predicted state, in contrast, is the state that is calculated in advance based on characteristics and events that are likely to occur in a manufacturing facility.

The real time state engine 222 stores the resulting state of the factory in the database 214. The data provider 210 retrieves the real time factory state from the database 214 and sends it to comparator 224. The data provider 210 may also retrieve the real time factory state from the database 214 and send it to a prediction monitor client 250. In one embodiment, the data provider 210 sends the real time factory state upon receiving a real time factory state request from a prediction monitor client 250.

A comparator 224 receives the real time factory state from real time state engine 222 and the predicted factory state from data provider 210 and compares the data to each other to determine whether a variance between the actual state and the predicted state of the factory exists. When comparator 224 detects a variance between the actual state and the predicted state of the factory, comparator 224 may compare the amount of the variance to a threshold. In some cases, a variance may exist, but may not be of a significant value. A threshold may be a predefined threshold or may be a threshold configurable (e.g., user-configurable) via UI module 208. Comparator 224 presents the results of the comparison of the data to an alarm generator 226.

The alarm generator 226 manages alerts and alarms for prediction server 200. Alarm generator 226 may be standalone or may be integrated with existing production services. Alarm generator 226 may receive a determination from comparator 224 that the actual factory state varies from the predicted factory status. When a variance exceeds a threshold, alarm generator 226 may send a notification of the variance, for example, to production line control or engineering. A notification may be a warning, alert, or an alarm. Alarm generator 226 may also send a notification to automation controllers.

The UI module 208 provides a UI allowing a user to specify parameters for the prediction monitoring process. The UI may allow a user to enter a time horizon (a point of time in the future for which predictions should be generated). The user may also specify sources systems to which data queries should be submitted, characteristics of the data queries, how predictions should be generated (e.g., using simulation, forecasting, statistical prediction, trend analysis, or calculations), how a real time state of the factory should be generated, a variance threshold, and how alarms should be generated. In addition, the user may identify entities for which prediction should be generated (e.g., equipment, product, operators, resources, etc.), and specify a trigger for initiating the prediction process (e.g., an event, a scheduled time, or user request).

Figure 10C:
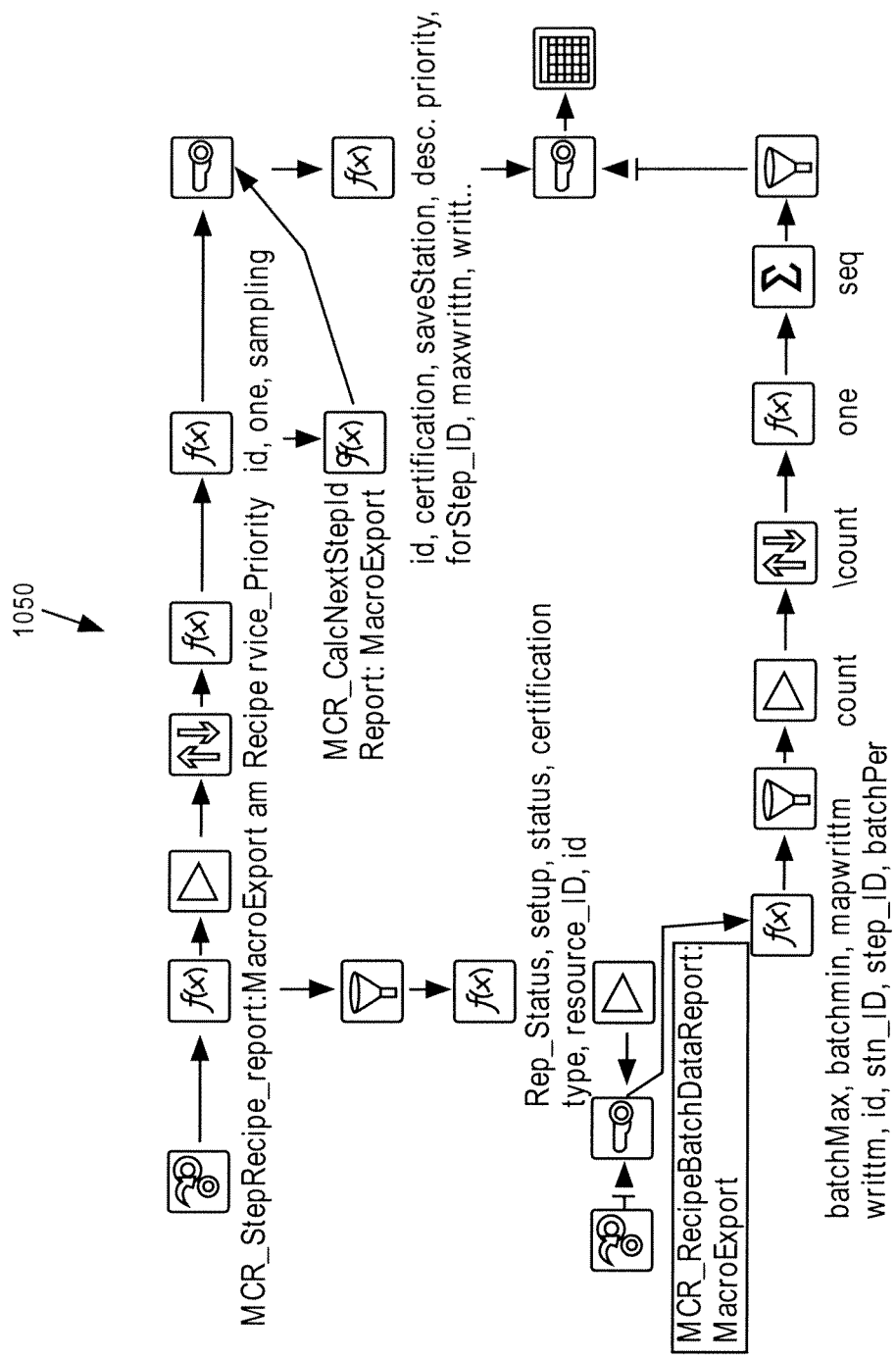
FIG. 10C is an exemplary GUI of a data schema of an exemplary step definition table, in accordance with one embodiment of the invention.

The UI module 208 may further provide a UI allowing a user to specify parameters for generation of the real time state of the factory. These parameters may include, for example, parameters for generating a query each source system used to collect data. In one embodiment, UI module 208 provides a workflow user interface to allow a user to specify a workflow for monitoring a manufacturing facility using predicted and actual data. For example, UI module 208 may provide a workflow user interface to allow a user to specify a workflow for extracting real time data reflecting the state of a manufacturing facility. FIG. 10C, described in more detail below, is an exemplary GUI of a workflow user interface for a step data table, in accordance with one embodiment of the invention. The UI module 208 may provide workflow templates, for example, for identifying stalled material, identifying stalled equipment, and identifying operation behavior variances. The workflow templates may further be user configurable.

In one embodiment, the UI module 208 also provides a UI allowing a user to specify repair parameters such as events that should cause repair, data to be obtained in response to these events, type of repair (e.g., update or regeneration), etc. In one embodiment, the UI module 208 further provides a UI allowing a prediction monitor client 250 to specify alert and visualization preferences. For example, the prediction monitor client 250 may identify conditions for receiving predictions (e.g., generation of new predictions, repair of existing predictions, etc.) and the real time state of the factory.

The prediction repair module 206 looks for an occurrence of a critical event, and then repairs the existing predictions. The prediction repair module 206 may update the predictions stored in the database 214 using simple calculations, or alternatively it may invoke the prediction execution engine 204 to generate new predictions.

The prediction tuner 228 tunes the prediction model. The prediction tuner 228 may edit data content to the data generation components. The prediction tuner 228 may also perform data maintenance by analyzing the results between the prediction and actual data. For example, data maintenance may be performed for process times, process routes, and equipment model definition.

Figure 2B:
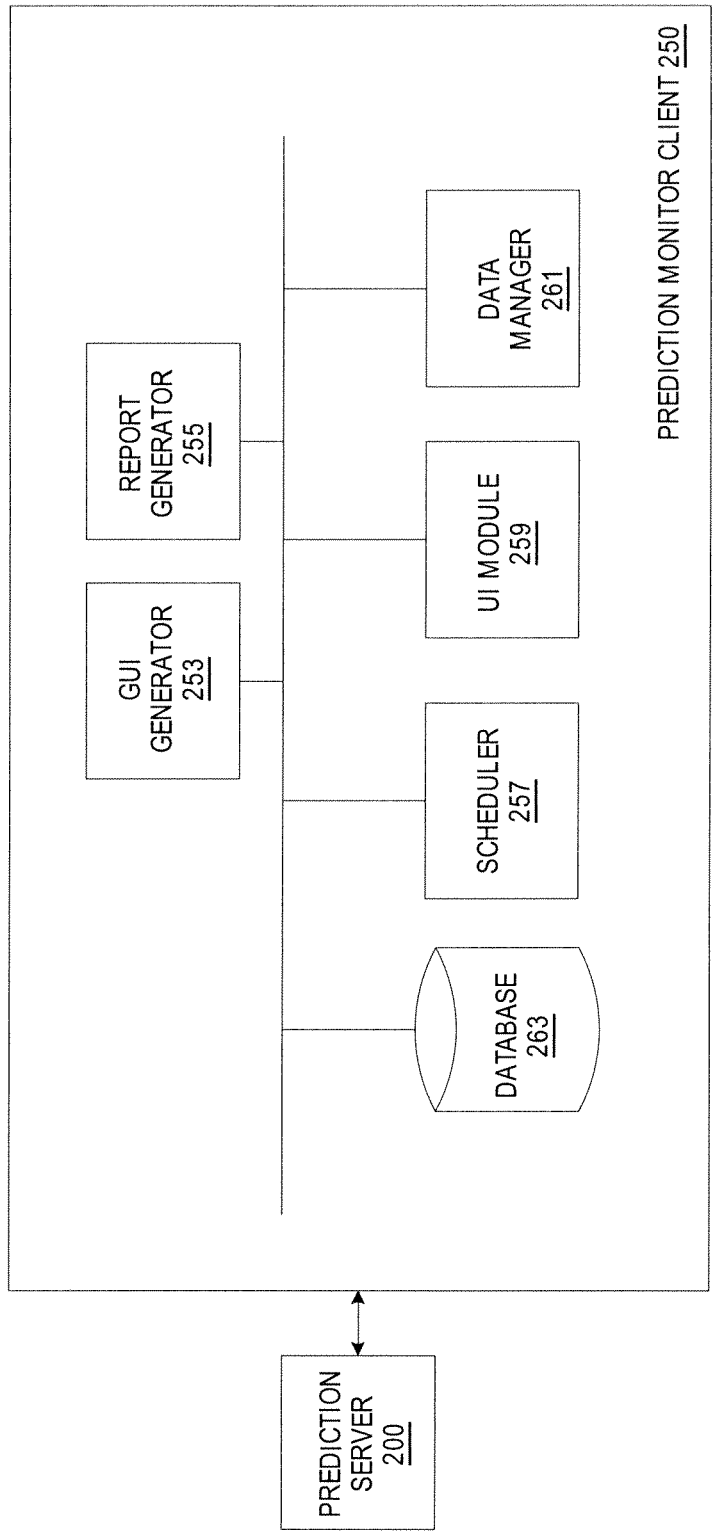
FIG. 2B is a block diagram of one embodiment of a prediction monitor client.

FIG. 2B is a block diagram of one embodiment of a prediction monitor client 250. The prediction monitor client 250 may include a GUI generator 253 and a report generator 255. The GUI generator 253 generates GUIs to present prediction results, real time data, and comparisons of prediction results with real time data. The report generator 255 may generate standard and user definable reports of the data of the actual factory state and the predicted factory state. The report generator 255 may generate reports on a schedule as determined by a scheduler 257 or by receiving a user input via a UI module 259. In one embodiment, the report generator 255 generates reports in real time in order to identify and resolve issues as soon as possible. The prediction monitor client 250 may include a data manager 261 to request data from prediction server 200 and to receive data from prediction server 200. The data manager 261 may further update, clear, and export the data presented by the GUI generator 253 and the data reported by the report generator 255. The data manager 261 may update, clear, and export data based on a user input or direction received from scheduler 257. The prediction monitor client 250 may include a database 263 to store data received from prediction server 200, data for the scheduler 257, and data generated by the GUI generator 253 and/or the report generator 255. The database 263 may reside on a data storage device that may consist of one or more types of removable storage and/or one or more types of non-removal storage. The UI module 259 provides a UI allowing a user to specify parameters for the visualization and reporting tools. The UI may allow a user to enter a schedule for generating GUIs and reports or an on demand request for generating a GUI or a report. The user may also specify the types of GUIs or reports to generate and whether to update, clear, or export data.

Figure 3:
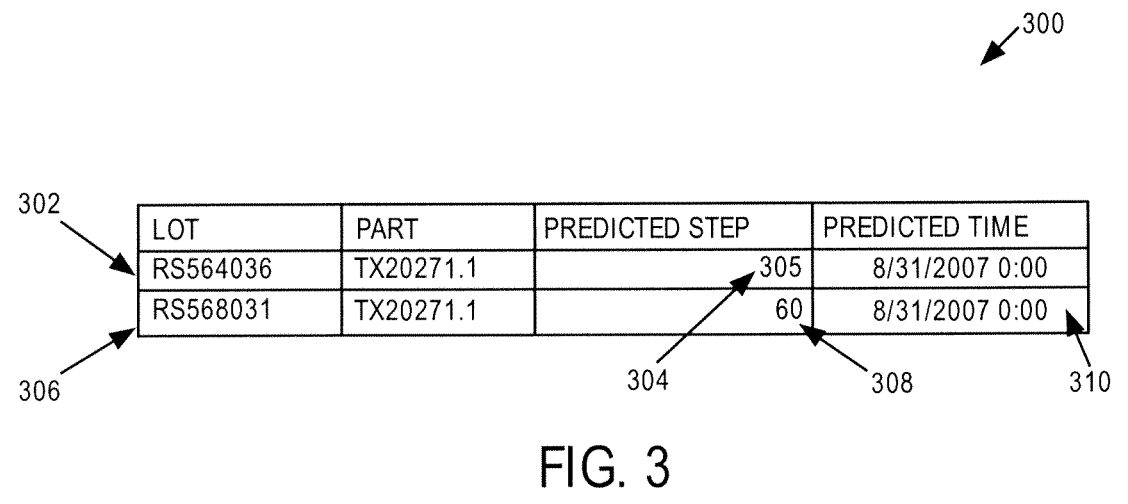

FIG. 3 is an exemplary table 300 of predicted output, in accordance with one embodiment of the invention. Prediction server 200 may generate the predicted output and prediction monitor client 250 may generate table 300. Table 300 illustrates the expected arrival time for LOT RS564036 (302) to arrive at STEP 305 (304) and the expected arrival time for LOT RS564036 (306) to arrive at STEP 60 (308). In this example, both lots are expected to arrive at their respective steps at TIME Aug. 31, 2007 0:00 (310).

Figure 4A:
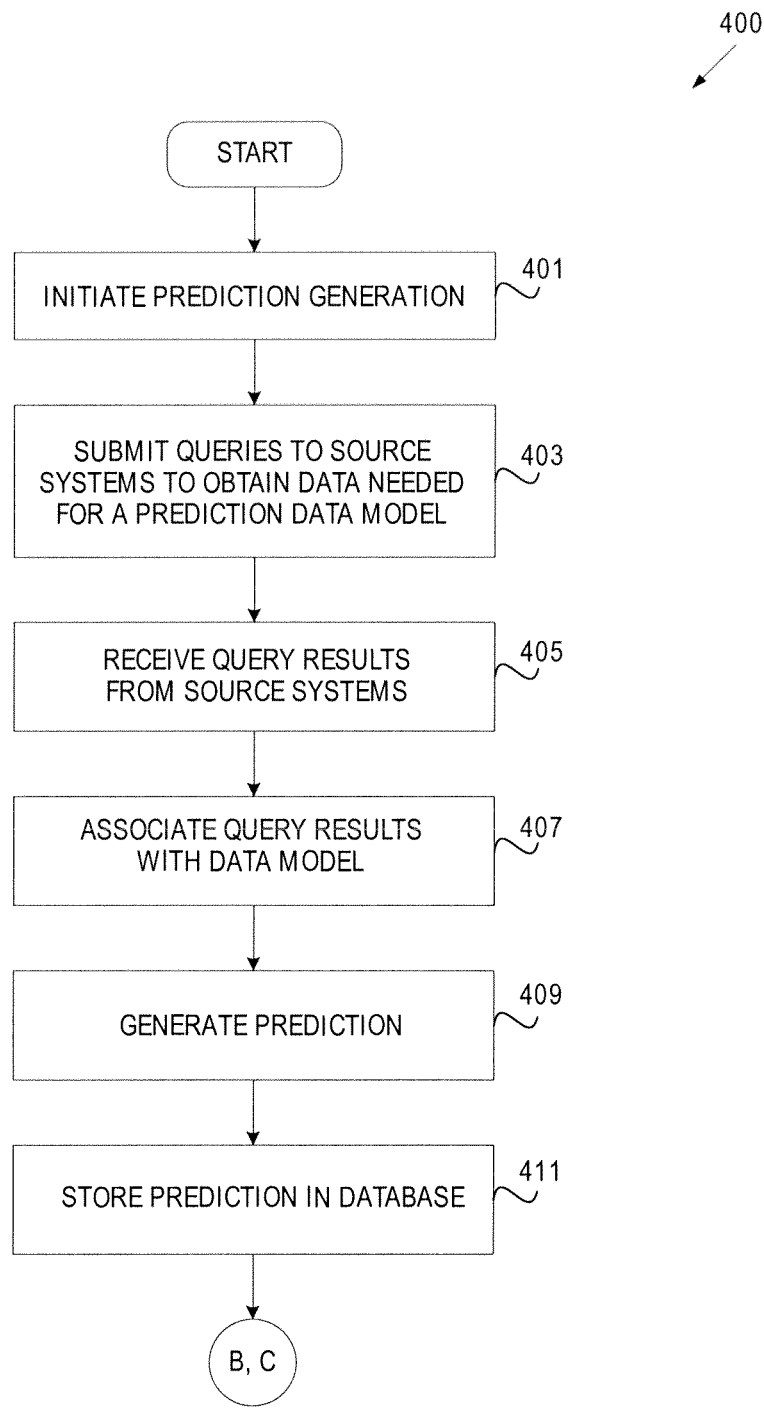
FIG. 4A illustrates one embodiment of a method for monitoring actual production targets using predicted data.
Figure 4B:
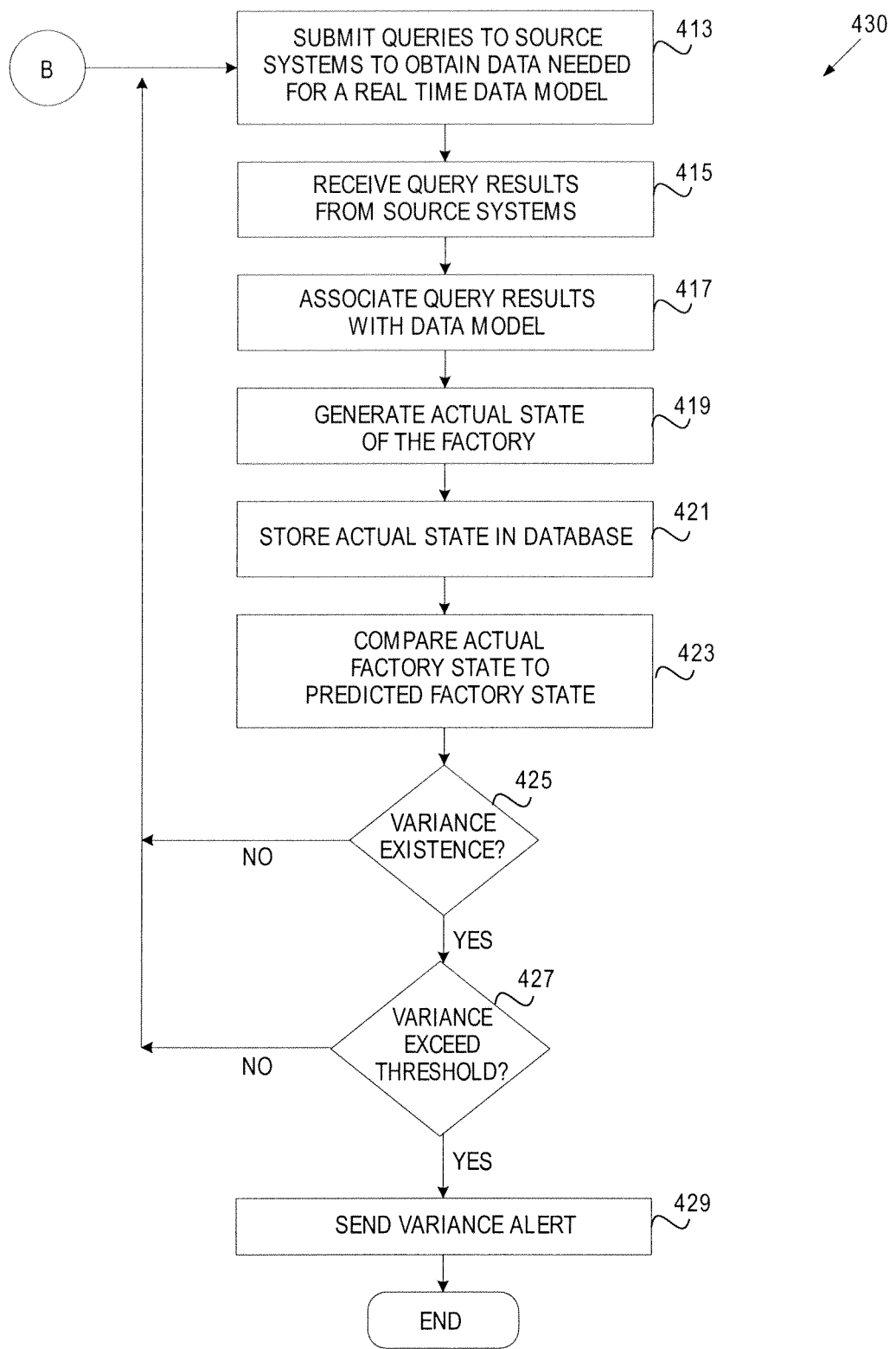
FIG. 4B illustrates one embodiment of a method for sending an alert to monitor actual production targets while using predicted data.

FIGS. 4A and FIG. 4B illustrate one embodiment of a method for monitoring actual production targets using predicted data. The method may be performed by processing logic that may comprise hardware (e.g., circuitry, dedicated logic, etc.), software (such as run on a general purpose computer system or a dedicated machine), or a combination of both. In one embodiment, processing logic resides in a prediction server 102 of FIG. 1.

Referring to FIG. 4A, processing logic begins with initiating prediction generation (block 401). Processing logic may initiate the prediction generation at a scheduled time or upon a user request or upon an occurrence of a predefined event.

At block 403, processing logic submits queries to source systems to obtain data for a prediction data model. A prediction data model defines a set of data needed for generating predictions. Queries submitted to the source systems may be created based on the type of data needed for the prediction data model. In one embodiment, the queries are created on the fly. Alternatively, the queries are predetermined for each source system used to collect data. The queries may be specified by the user or be created automatically based on data needed for the prediction data model.

At block 405, processing logic receives query results from the source systems. At block 407, processing logic puts query results in the prediction data model (i.e., populates the prediction data model). Once building of the prediction data model is completed, processing logic generates predictions (block 409). Processing logic may generate predictions by making calculations, forecasting, statistical prediction, trend analysis, running simulation, or using any other technique. Processing logic may execute the prediction model forward a short time horizon to predict the state of factory operations. In one embodiment, the duration of the short time horizon is defined by a user input. In another embodiment, the duration of the short time horizon is pre-defined. For example, the prediction model may be executed to predict operations occurring up to 10 hours ahead (e.g., lot start and complete times). For instance, LOTS 1-18 may be scheduled for sequential processing in the next 10 hours. The prediction model may be executed forward 10 hours to generate the predicted start time and complete time for each of the 18 lots. The results may predict LOT 1 to start at 00:00 hour and complete at 00:10 hour, LOT 2 to start at 00:15 hour and complete at 00:35 hour, LOT 3 to start at 00:35 hour and complete at 00:45 hour, etc.

At block 411, processing logic stores the generated predictions in a database. The database may then be accessed to provide predictions to a prediction monitor client. This data may be persisted in a commercial database, a custom database and/or stored in application memory. The method 400 may continue to reference B of method 430 of FIG. 4B. The method 430 may continue to reference C of method 450 of FIG. 4C.

FIG. 4B illustrates one embodiment of a method for monitoring actual production targets using predicted data. In particular, method 430 sends an alert or provides a notification when a variance between the actual factory state and the predicted factory state exceeds a threshold.

In one embodiment, a defined real time data model exists for defining the data needed. A real time data model defines a set of data needed for generating the actual state of a factory. A real time data model may include a Part table, WIP table, Station table, Step table, Setup table, Seasoning table, and PM Order table. Processing logic may receive a user input creating data sources and assigns the data sources to defined data tables. In one embodiment, processing logic provides a selection of APF Formatter blocks corresponding to defined schemas.

At block 413, processing logic submits queries to source systems (e.g., production, material control, and quality applications) to obtain data for a real time data model. Data may be queried through data interfaces to key productions systems. Data tables may be populated from data sources, such as an APF Report/Rule, an activity manager job, a web service call, and an import file. Queries submitted to the source systems may be created based on the type of data needed for the real time data model. In one embodiment, the queries are created on the fly. Alternatively, the queries are predetermined for each source system used to collect data. The queries may be specified by the user or be created automatically based on data needed for the real time data model.

At block 415, processing logic receives the query results from the source systems. At block 417, processing logic puts query results in the real time data model (i.e., populates the real time data model). Once building of the real time data model is completed, processing logic generates the actual state of the factory (block 419). For instance, using the above example, a prediction model was executed forward 10 hours to generate the predicted start and stop time for LOTS 1-18. In an example where the current time is 00:00 hour, the query result may include an actual start time for LOT 1 as 00:00 hour. As such, for a current time of 00:00 hour, the actual state of the factory includes LOT 1 starting at 00:00 hour.

At block 421, processing logic stores the actual state of the factory in a database. The database may then be accessed to provide the actual state of the factory to prediction monitor client. This data may be persisted in a commercial database, a custom database and/or stored in application memory.

At block 423, processing logic compares the actual factory state to the predicted factory state. At block 425, processing logic determines whether a variance between the actual factory state and the predicted factory state of the factory exists. If, at block 425, a variance does not exists, processing logic returns to block 413 to query the source systems to build the real time data model for the next factory operation to occur. For example, the actual start time for LOT 1 is compared to the predicted start time for LOT 1. In this example, LOT 1 was predicted to start at 00:00 hour. The actual state of the factory includes LOT 1 starting at 00:00 hour. As such, LOT 1 started at the predicted start time and no variance exists. Processing logic returns to block 413 to query the source systems to build the real time data model for the next factory operation. In this example, the next factory operation is the completion of processing LOT 1.

For example, at block 415, processing logic may receive the actual complete time for LOT 1 as 00:20 hour and associates the actual data with the real time data model. Processing logic generates the actual state of the factory at block 421. At block 423, processing logic compares the actual complete time to the predicted complete time. In this example, LOT 1 was predicted to complete at 00:10 hour. At block 425, processing logic determines there is a variance between the actual complete time and the predicted complete time of 10 minutes. If, at block 425, a variance exists, processing logic continues to block 427.

At block 427, processing logic determines whether the variance exceeds a threshold. In one embodiment, the threshold is a predefined threshold. In another embodiment, the threshold is a user configurable threshold. If at block 427, the variance does not exceed a threshold, processing logic returns to block 413 to query the source systems for the next factory operation to occur. If at block 427, the variance does exceed a threshold, a variance alert is sent at block 429. For example, a 10-minute variance in completion time for LOT 1 may exceed a threshold and a variance alert is sent. Examples of a variance alert include a notification of a deviation, a warning, an alert, and an alarm. A variance alert may be sent to production line control. Production line control may receive the variance alert and interpret it as an indication of stalled material or stalled equipment and may investigate the issue. Alternatively, a variance alert may be sent to automation controllers.

Another example of a variance alert includes notifying production control of the non-conformance of operating procedures for the processing sequence of material. The prediction service may not only monitor progress of material and equipment activity, but may also identify behavior differences in operational activity. For example, processing logic may receive a user input identifying a specific equipment type to process hot lots first, and to process material based on a critical ratio. Where the equipment set is manually operated and the operator is processing low-priority lots when high priority lots are in the queue, processing logic may send an alert of the variance.

Figure 4C:
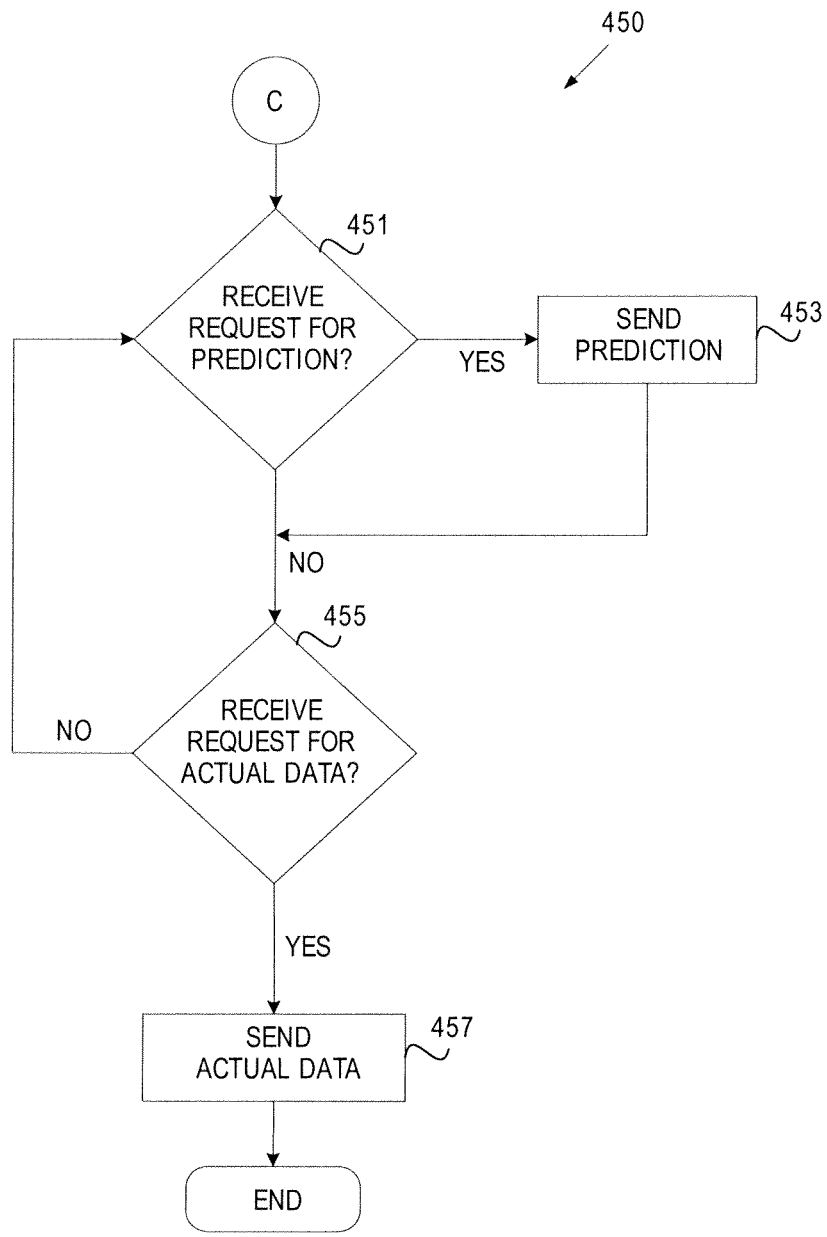
FIG. 4C illustrates one embodiment of a method for providing predictions and real time data.

FIG. 4C illustrates one embodiment of a method for monitoring actual production targets using predicted data. In particular, method 450 provides predictions and real time data to, for example, a prediction monitor client. The method may be performed by processing logic that may comprise hardware (e.g., circuitry, dedicated logic, etc.), software (such as run on a general purpose computer system or a dedicated machine), or a combination of both. In one embodiment, processing logic resides in a prediction server 102 of FIG. 1.

At block 451, processing logic determines whether a request for a prediction is received from a requestor (e.g., a prediction monitoring client). If a request for a prediction is received, the prediction is sent to the requestor at block 453. If a request for a prediction is not received, processing logic continues to block 455. At block 455, processing logic determines whether a request for actual data (real time data) is received. If a request for actual data is received, the actual data is sent to the requestor at block 457. If a request for actual data is not received, processing logic returns to block 451.

Figure 5:
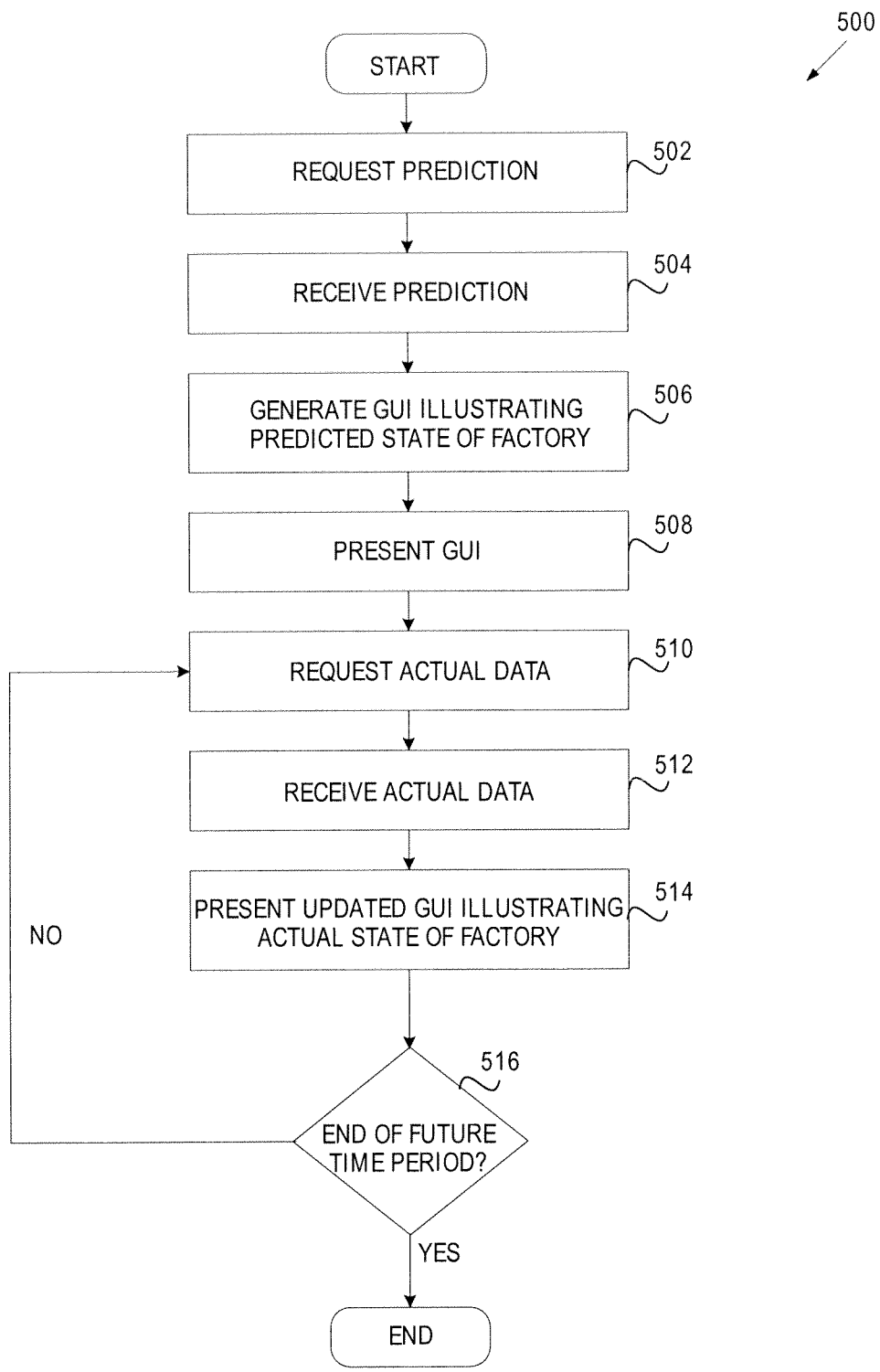
FIG. 5 illustrates one embodiment of a method for presenting a comparison of predicted data versus actual data in a graphical user interface (GUI)

FIG. 5 illustrates one embodiment of a method for monitoring actual production targets using predicted data. In particular, method 500 presents a comparison of predicted data versus actual data in a GUI. The method may be performed by processing logic that may comprise hardware (e.g., circuitry, dedicated logic, etc.), software (such as run on a general purpose computer system or a dedicated machine), or a combination of both. In one embodiment, processing logic resides in a prediction monitor client 106 of FIG. 1.

Figure 6:
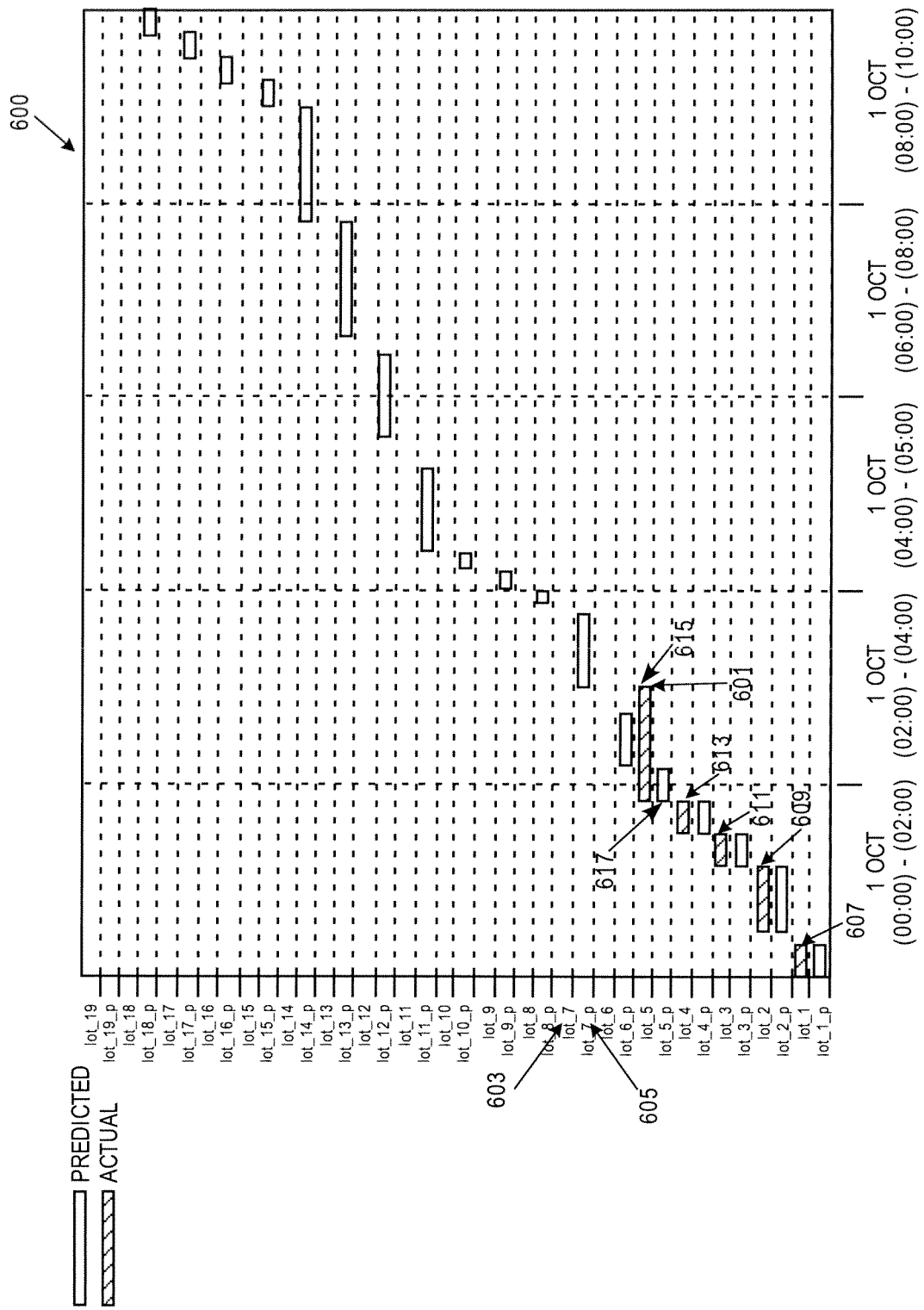
FIG. 6 is an exemplary GUI for presenting a predicted state of a factory, in accordance with one embodiment of the invention.

At block 502, processing logic submits a request to a prediction server for a prediction. At block 504, processing logic receives the prediction. At block 506, processing logic generates a GUI to illustrate the predicted state of the factory. FIG. 6, described in more detail below, is an exemplary GUI for presenting the predicted state of the factory, in accordance with one embodiment of the invention. At block 508, processing logic presents the GUI. In some embodiments, the GUI may be generated by a prediction server and accessible via a web browser.

At block 510, processing logic submits a request to a prediction server for the actual (real time) state of the factory. At block 512, processing logic receives the actual factory state. Processing logic also receive the real time data used to generate the actual factory state. For instance, in the above example relating to lot start and complete time, at block 510, processing logic may receive the actual start time for LOT 1 as 00:00 hour.

At block 514, processing logic updates the GUI with the actual data and presents the updated GUI. For example, the updated GUI may illustrate the actual start time for LOT 1 as 00:00 hour alongside the predicted start time for LOT 1. FIG. 6, described in more detail below, illustrates an exemplary GUI for presenting a predicted factory state updated with an actual factory state, in accordance with one embodiment of the invention.

At block 516, processing logic determines whether the end of the duration of the short time horizon corresponding to the predicted data has been reached. In one embodiment, prediction server simulated the equipment behavior step by step, synchronized in time, until reaching a specific point in the future. If, at block 516, processing logic determines that the end of the duration has not been reached, processing logic returns to block 510 to request the actual data for the next factory operation. If, at block 516, processing logic determines that the end of the duration has been reached, the method ends. For instance, in an example where the prediction model was executed forward 10 hours, processing logic may repeatedly return to block 510 to request and receive actual data for multiple factory operations (e.g., start and complete times for LOTS 1-18) until the end of the 10 hour duration is reached.

FIG. 6 illustrates an exemplary GUI for presenting a predicted factory state updated with an actual factory state, in accordance with one embodiment of the invention. In this example, GUI 600 presents the predicted start time and complete time and actual start time and complete time for a number of lots. GUI 600 may include an x-axis and y-axis. GUI 600 may also include colored bar graphs to represent predicted data and actual data (e.g., using different colors or shades for predicted data and actual data). In other embodiments, a GUI may use other visual indicators to represent data.

The y-axis may represent multiple lots and the respective actual and predicted data for each lot. In this example, the y-axis identifies actual data for a lot as "lot_[y]," where [y] is the number of the lot. For example, the y-axis identifier for the actual data for LOT 5 is "lot__5" (603). The y-axis uses "lot_[y]_p," where [y] is the number of the lot, to denote predicted lot data. For example, the y-axis identifier for the predicted data for LOT 5 is "lot__5_p" (605). Bar graph 615 illustrates the actual data for LOT 5 and bar graph 617 illustrates the predicted start time and complete time for LOT 5. In this example, the x-axis represents time for a particular day. GUI 600 represents time in increments of two hours.

GUI 600 presents the predicted state of factory operations for a prediction model that was executed forward 10 hours. The predicted lot start time and complete time for LOTS 1-19 are illustrated by multiple bar graphs. In one embodiment, as actual factory data is received, GUI 600 is updated to present the actual state of the factory. In this example, GUI 600 illustrates real-time data gathered as of a current time of 03:00 (601). As of current time 601, actual data has been received for lot__1 (607), lot__2 (609), lot__3 (611), lot__4 (613) and lot__5 (615) as illustrated by their corresponding bar graphs representing actual data.

Visually illustrating predicted state transitions may allow operators to identify issues in a factory. GUI 600 presents a side-by-side comparison of the predicted start and complete time and the actual start and complete time for a number of lots. In other embodiments, a GUI may use other visual indicators to compare data. For example, a comparison of actual and predicted data for LOT 5 is illustrated by bar graphs 615 and 617. At current time 601, bar graph 615 shows that LOT 5 has actually started on a tool, but has yet to be completed. Comparing bar graph 615 to bar graph 617, an operator may see that LOT 5 has started at the predicted time, but did not complete as predicted. GUI 600 provides a visual indication that LOT 5 has an actual processing time that exceeds the predicted processing time by a factor of at least 3.

Figure 7:
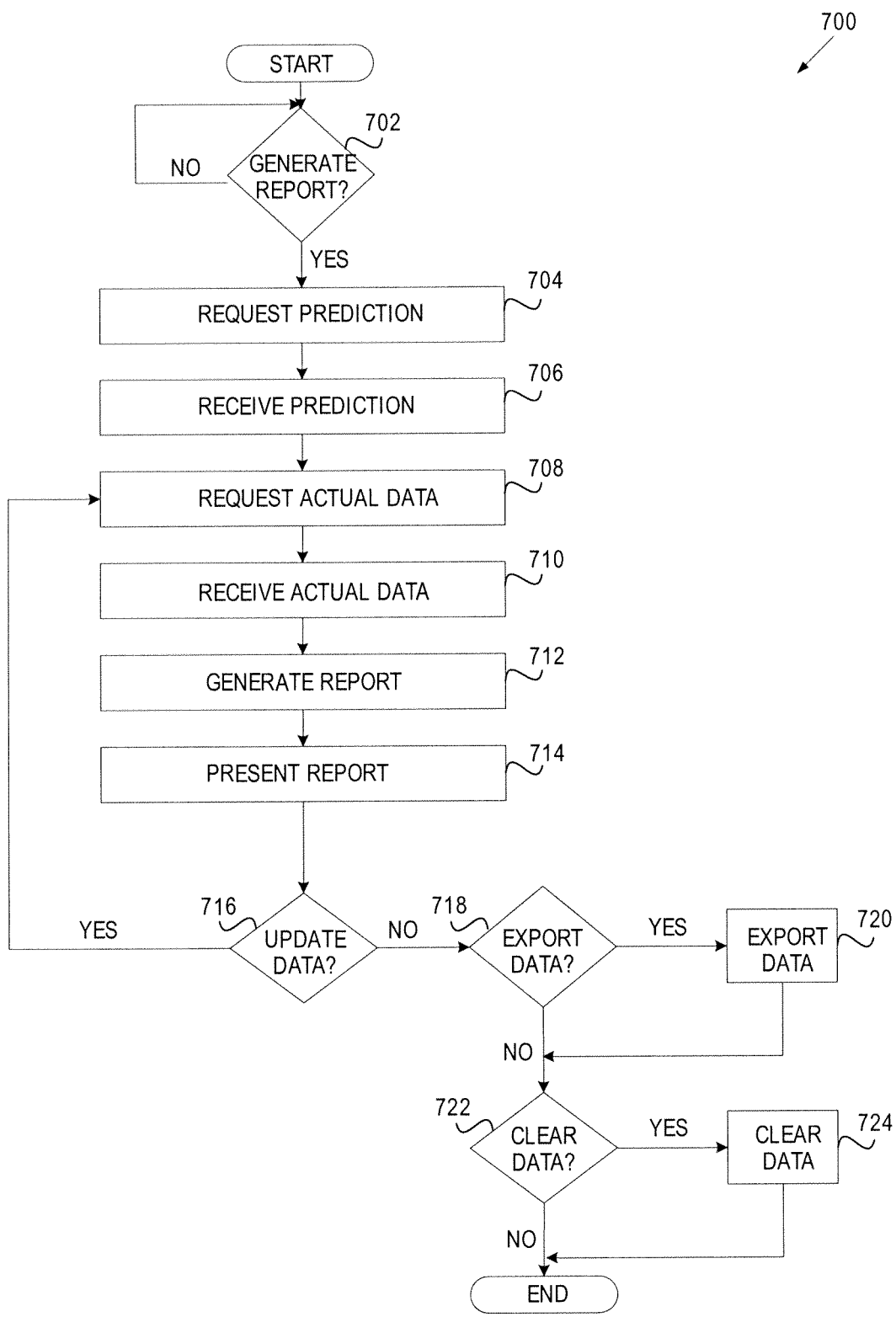
FIG. 7 illustrates an embodiment of a method for generating a report to monitor actual production targets while using predicted data.

FIG. 7 illustrates an embodiment of a method for monitoring actual production targets using predicted data. In particular, method 700 generates a report. Examples of a report include a historical report, a graphical historical report, and a graphical report of predicted data compared to actual data. The method may be performed by processing logic that may comprise hardware (e.g., circuitry, dedicated logic, etc.), software (such as run on a general purpose computer system or a dedicated machine), or a combination of both. In one embodiment, processing logic resides in a prediction monitor client 106 of FIG. 1.

At block 702, processing logic determines whether to generate a report. Processing logic may generate a report upon receiving a user input. Alternatively, processing logic may generate a report based on a schedule. If, at block 702, the method determines to not generate a report, the method returns to the start of the method. If, at block 702, the method determines to generate a report, the method continues to block 704.

At block 704, processing logic requests a prediction from prediction server. At block 706, processing logic receives the prediction. Processing logic may store the prediction in a database. At block 708, processing logic requests the actual data for the factory operations (block 706) and receives the actual data (block 710). Processing logic may also request and receive the actual state of the factory. Processing logic may store the data relating to the actual state of the factory operations in a database.

At block 712, processing logic generates a report. Examples of a report include a standard report for monitoring alarms, a standard report for monitoring components of prediction accuracy, or a user definable report. A report may provide real time information to identify alerts that may be reviewed, for example, by production line control, and detailed operational comparisons of the predicted data with that of the actual data. Processing logic may highlight variances between the predicted and actual data.

Figure 8A:
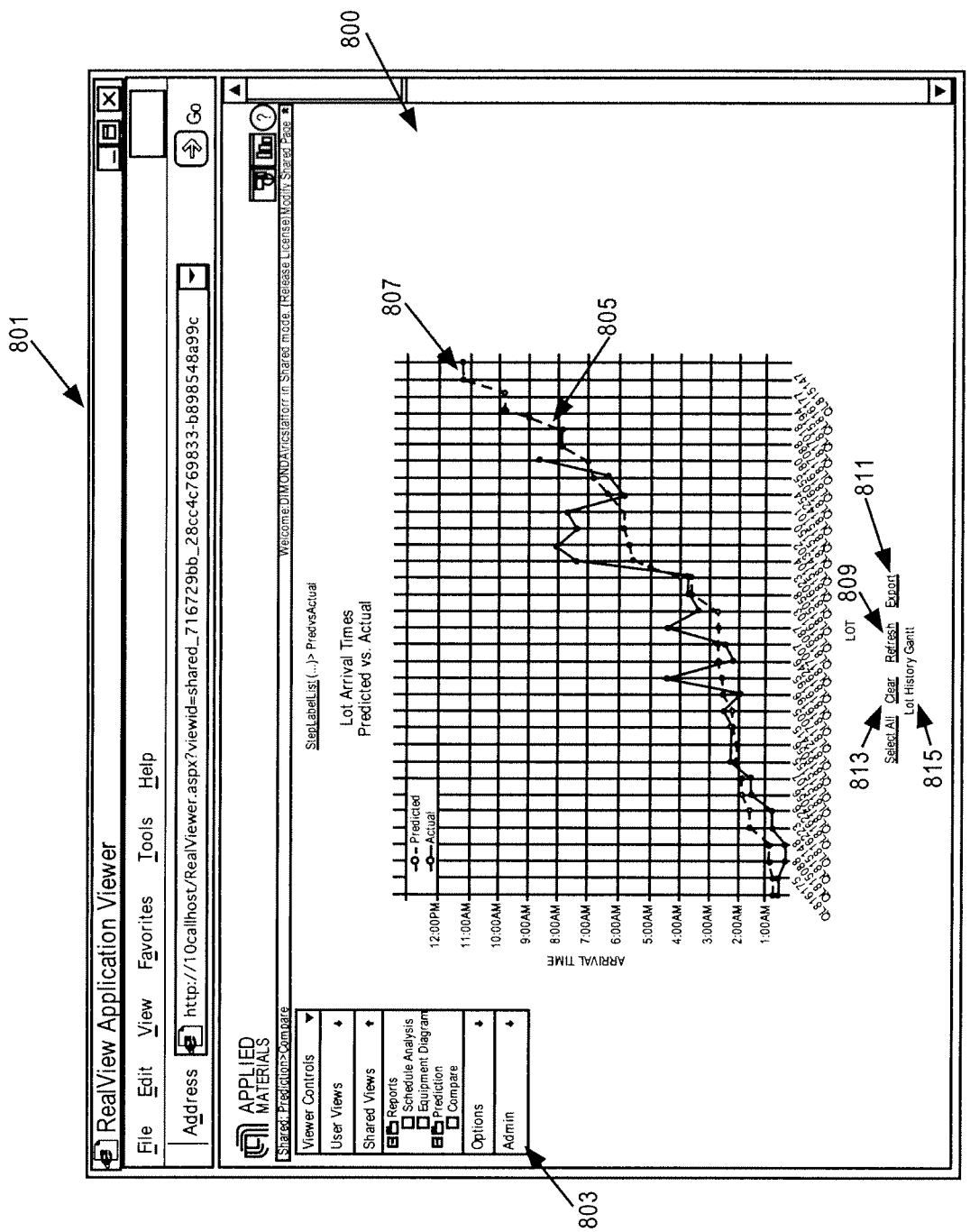
FIGS. 8A-8B are exemplary GUIs of graphical reports of predicted data compared to actual data, in accordance with one embodiment of the invention.
Figure 8B:
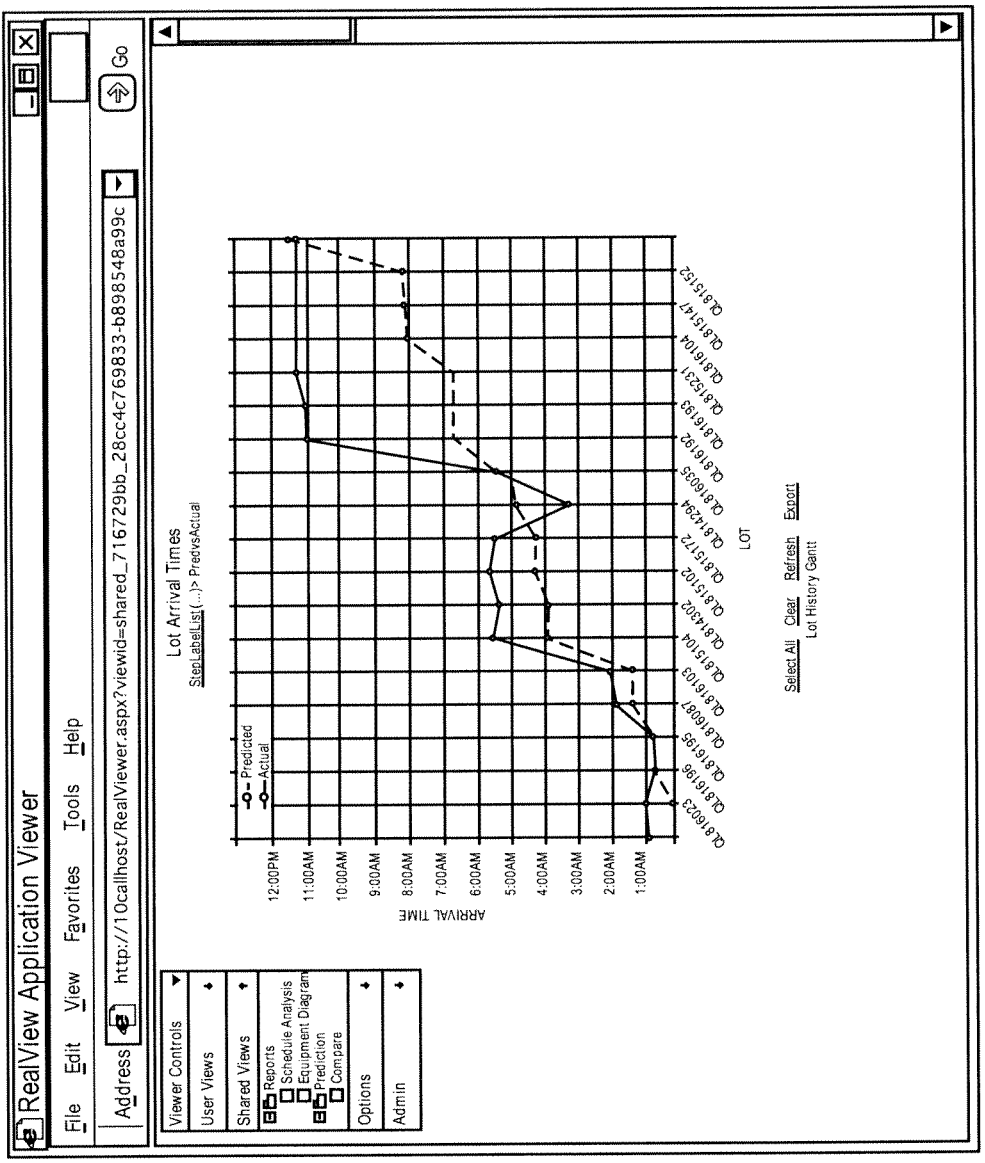
Figure 9A:
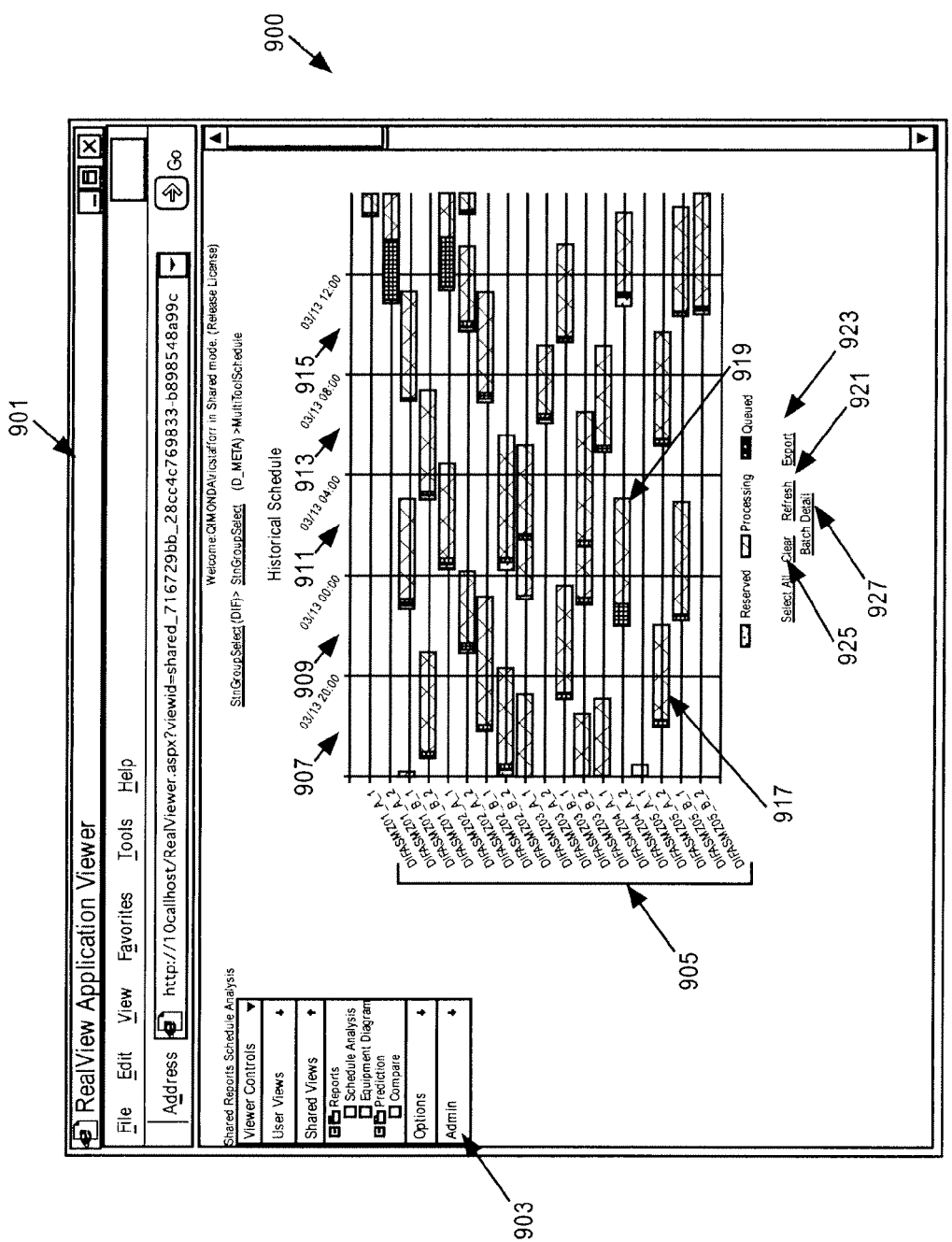
FIGS. 9A-9C, are exemplary historical reports, in accordance with one embodiment of the invention.
Figure 9B:
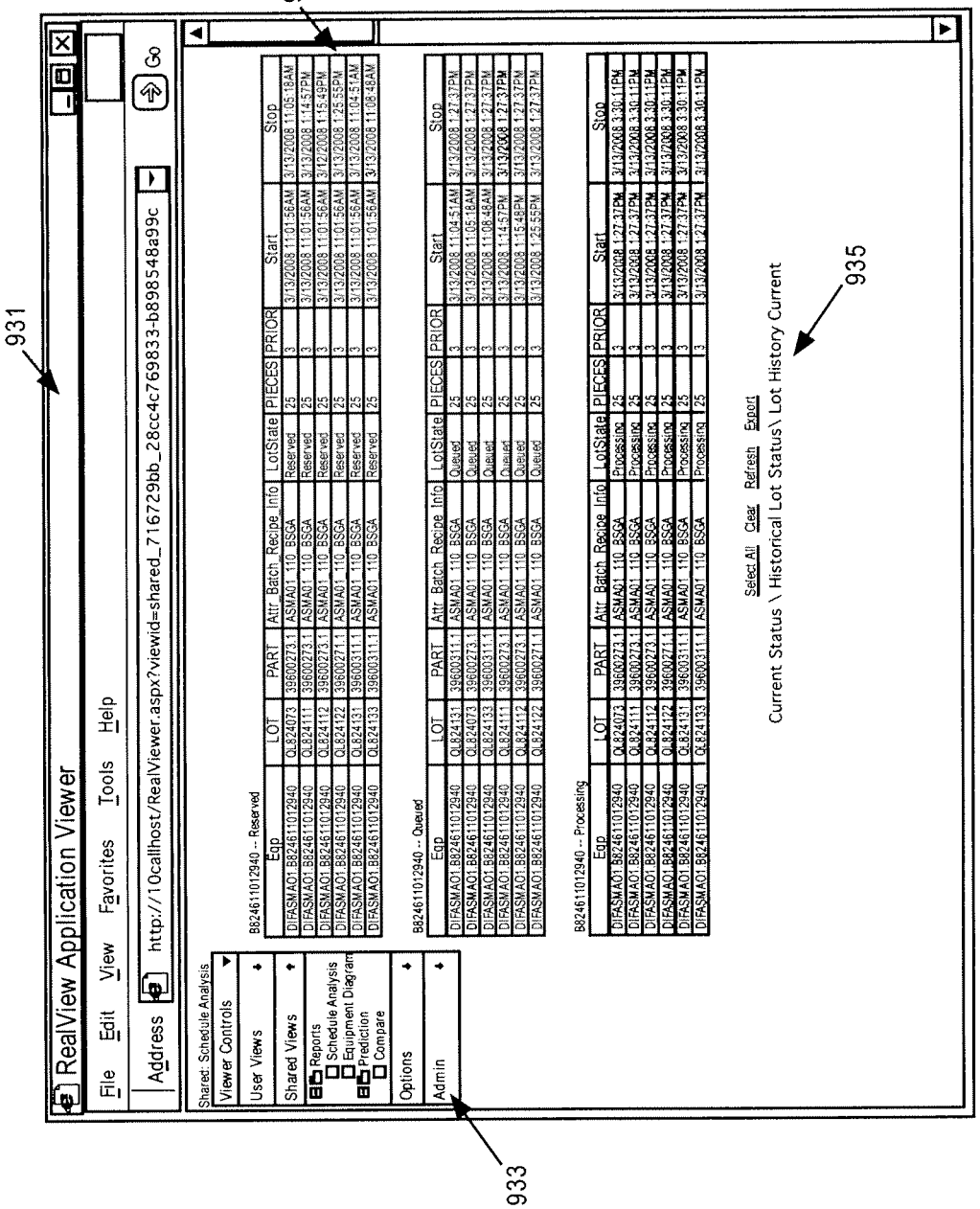
Figure 9C:
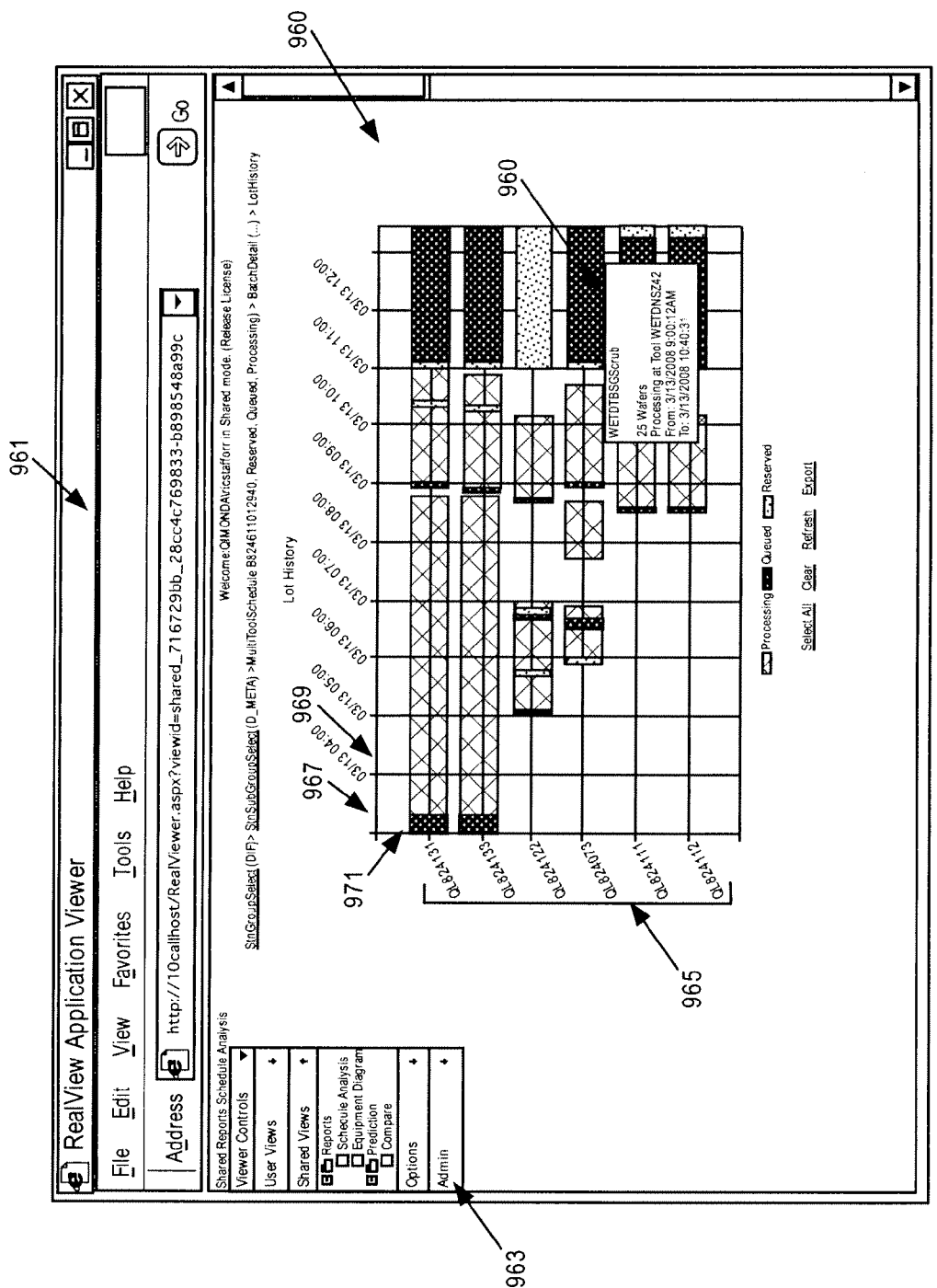

A report may be a graphical report of predicted data compared to actual data. FIGS. 8A-8B, described in more detail below, are exemplary GUIs of graphical reports of the predicted lot arrival times compared to the actual lot arrival times, in accordance with one embodiment of the invention. A report may be a historical report. Some examples of historical reports include a graphical historical report and a tabular historical report. FIGS. 9A-9C, described in more detail below, are exemplary historical reports, in accordance with one embodiment of the invention.

At block 714, processing logic presents the report. The report may be presented via a GUI generated by a client, or by a server and accessible via a web browser. At block 716, processing logic determines whether to update the data presented in the report. The data presented in the report may be updated automatically in real time (as changes occur) or based on a user input. Alternatively, processing logic may update the data presented in the report based on a schedule. If, at block 716, processing logic determines to update the data presented in the report, processing logic returns to block 708 to request the current actual data. Processing logic may generate and present a report having updated information. If, at block 716, processing logic determines to not update the data presented in the report, processing logic may continue to block 718.

At block 718, processing logic determines whether to export the data presented in the report. The data in the report may be exported based on a user input. If, at block 718, processing logic determines to export the data, the data is exported at block 720. The data may be exported in any number of formats. Once the data is exported at block 720, processing logic continues to block 722. If, at block 718, processing logic determines to not export the data, processing logic continues to block 722.

At block 722, processing logic determines whether to clear the data presented in the report. The data may be cleared based on a user input. If, at block 722, processing logic determines to clear the data, the data is cleared at block 724. If, at block 722, processing logic determines to not clear the data, the method ends.

FIGS. 8A and 8B are exemplary GUIs of graphical reports of the predicted lot arrival times compared to the actual lot arrival times, in accordance with one embodiment of the invention. GUI 800 may include a y-axis to represent arrival time and an x-axis to represent multiple lots. GUI 800 may be accessible via a web browser 801. GUI 800 may include an additional GUI 803 to manage the data presented. Data may be illustrated by colored line graphs. For example, a blue line graph 805 illustrates predicted lot arrival time and a green line graph 807 illustrates actual lot arrival time. In other embodiments, a GUI may use other visual indicators to represent data. GUI 800 may include an interface (809) to update (refresh) the GUI with current data, an interface to export the data (811), an interface to clear the data presented (813), and an interface to present a lot history (815). A graphical report of a lot history may be presented as a Gantt chart in a GUI.

FIG. 9A is an exemplary GUI 900 of a Gantt chart of historical lot data, in accordance with one embodiment of the invention. GUI 900 may be generated by a client, or by a server and accessible via a web browser 901. GUI 900 may include an additional GUI 903 to manage the data presented. A Gantt chart is a type of bar chart that may illustrate the start and completion times of elements. Each of the elements 905 illustrated in GUI 900 is equipment used in the factory operations. In this example, GUI 900 illustrates time in increments of 4 hours (907, 909, 911, 913, 915). For example, increment 909 represents the last 4 hours of March 12 and increment 911 represents the first 4 hours of the next day, March 13. A bar may use color to further illustrate the time a particular equipment is reserved, processing, and queued. In other embodiments, a GUI may use other visual indicators to further illustrate time. Bar 917 shows that equipment DIFASMZ05_A_2 started at 18:00 hours and completed at 22:00 hours. For a short time at the 18:00 hour, equipment DIFASMZ05_A_2 was reserved and queued. Bar 917 shows that equipment DIFASMZ05_A_2 was processing during most of its time. Whereas, bar 919 shows that equipment DIFASMZ04_A_2 spent more time queued compared to the queue time of equipment DIFASMZ05_A_2 (917). GUI 900 may include an interface to refresh the GUI with current data (921), an interface to export the data (923), an interface to clear the data presented (925), and an interface to present batch detail (927). A graphical report of batch detail may be presented as a table in a GUI.

FIG. 9B is an exemplary GUI 930 of a table of batch detail, in accordance with one embodiment of the invention. GUI 930 may be accessible via a web browser 931. GUI 930 may include an additional GUI 933 to manage the data presented. GUI 930 may include an interface to present a lot history (935). A graphical report of a lot history may be presented as a Gantt chart in a GUI.

FIG. 9C is an exemplary GUI 960 of a Gantt chart of historical lot data, in accordance with one embodiment of the invention. GUI 960 may be accessible via a web browser 961. GUI 960 may include an additional GUI 963 to manage the data presented. Each of the elements 965 illustrated in GUI 960 is a lot processed by factory operations. In this example, GUI 960 illustrates six lots being processed. GUI 960 illustrates time in increments of one hour. For example, increment 967 represents the hour between 03:00 and 04:00 and increment 969 represents hour between 04:00 and 05:00. A bar may use color to further illustrate the time the particular equipment is reserved, processing, and queued. In other embodiments, a GUI may use other visual indicators to further illustrate time. Bar 971 shows that LOT QL824131 queued from 03:00 to 03:15 and processed until 08:45. GUI 960 may include an additional interface 973 to present further details of a particular bar. Here, GUI 973 presents the details of LOT QL824073.

Figure 10D:
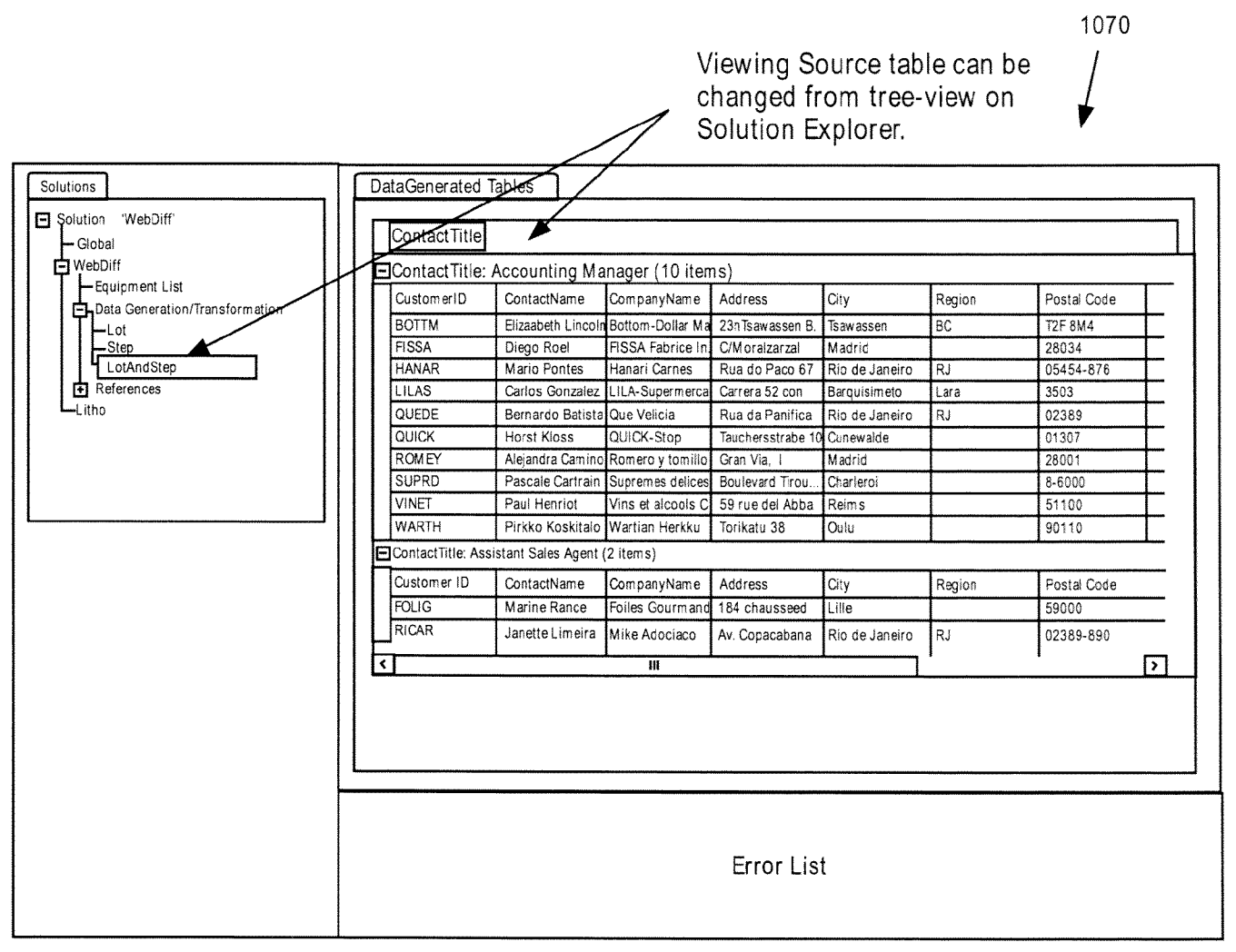

FIG. 10A is an exemplary GUI 1000 of a data schema 1002 of an exemplary real time data model, in accordance with one embodiment of the invention. The data schema 1002 may be a table schema or any other type of schema. The data schema 1002 may define multiple tables 1004 and may include a table description 1006 for each table. GUI 1000 may further provide details for a table by receiving a user input via a button 1008. In other embodiments, a GUI may use other visual indicators to receive a user input. FIG. 10B is an exemplary GUI 1030 of a data schema of an exemplary station data table, in accordance with one embodiment of the invention. GUI 1030 may include a name of the schema 1032 and a description of the schema 1034. In this example, GUI 1030 lists the fields comprising the station table schema. FIG. 10C is an exemplary GUI 1050 of a data schema of an exemplary step definition table, in accordance with one embodiment of the invention. In this example, GUI 1050 is a workflow user interface for a step data table. The workflow identifies a sequence of operations to be performed for a particular step. When the user selects the operations, they are displayed in the workflow user interface. In addition, the user may specify properties for each operation in the workflow user interface. The workflow, with the properties, may be stored in a repository for subsequent execution in response to a workflow trigger. The repository can represent any type of data storage, including, for example, relational or hierarchical databases (proprietary or commercial), flat files, application or shared memory, etc. FIG. 10D is an exemplary GUI (1070) for defining a real time data model, in accordance with one embodiment of the invention.

Figure 11:
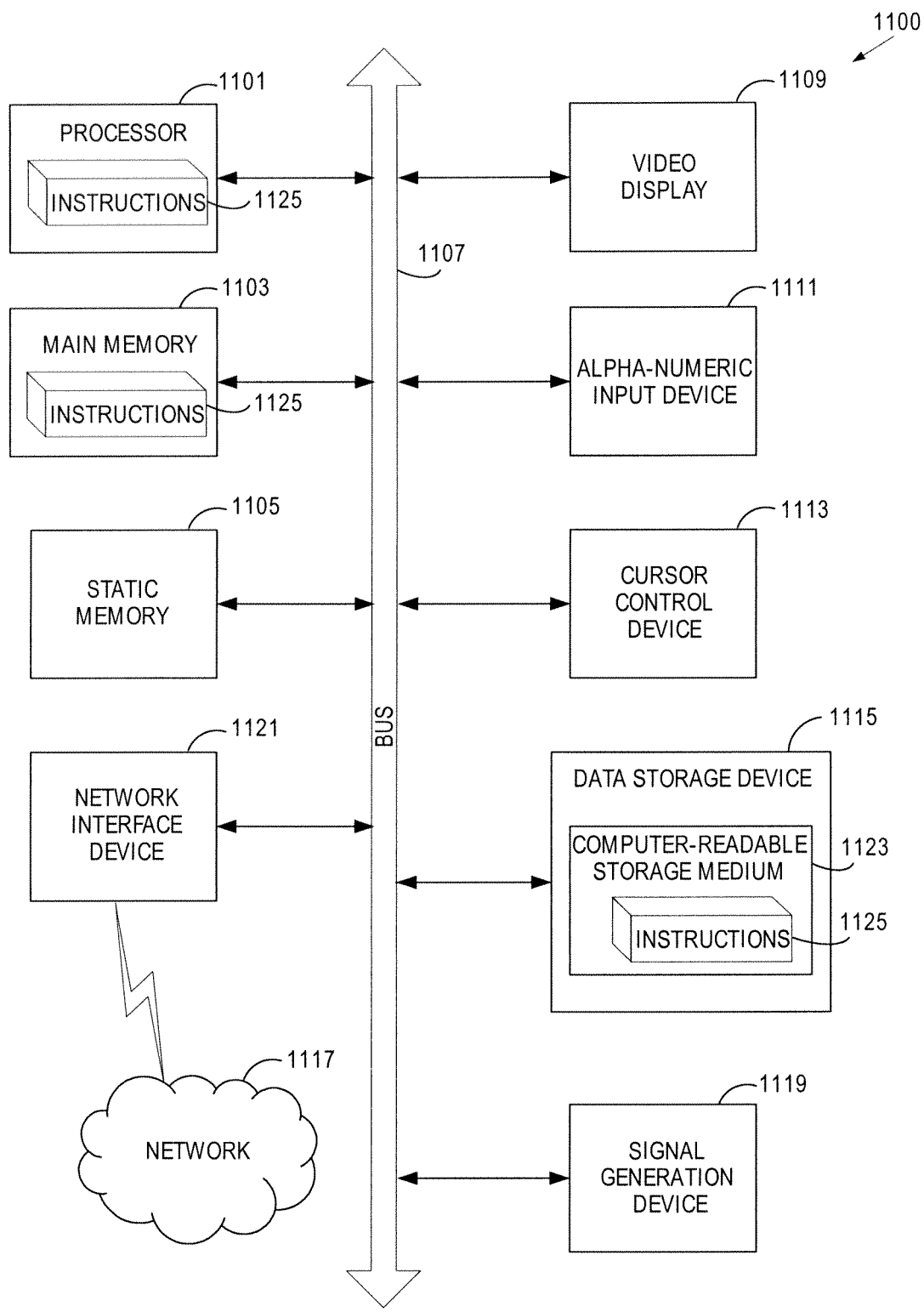
FIG. 11 illustrates an exemplary computer system.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1101, a main memory 1103 (e.g., read-only memory (ROM), flash memory, dynamic random access memory (DRAM) such as synchronous DRAM (SDRAM) or Rambus DRAM (RDRAM), etc.), a static memory 1105 (e.g., flash memory, static random access memory (SRAM), etc.), and a data storage device 1115, which communicate with each other via a bus 1107.

Processor 1101 represents one or more general-purpose processing devices such as a microprocessor, central processing unit, or the like. More particularly, the processor 1101 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1101 may also be one or more special-purpose processing devices such as an application specific integrated circuit (ASIC), a field programmable gate array (FPGA), a digital signal processor (DSP), network processor, or the like. The processor 1101 is configured to execute the instructions 1125 (e.g., processing logic) for performing the operations and steps discussed herein.

The computer system 1100 may further include a network interface device 1121. The computer system 1100 also may include a video display unit 1109 (e.g., a liquid crystal display (LCD) or a cathode ray tube (CRT)), an alphanumeric input device 1111 (e.g., a keyboard), a cursor control device 1113 (e.g., a mouse), and a signal generation device 1119 (e.g., a speaker).

The data storage device 1115 (e.g., drive unit) may include a computer-readable storage medium 1123 on which is stored one or more sets of instructions 1125 (e.g., software) embodying any one or more of the methodologies or functions described herein. The instructions 1125 may also reside, completely or at least partially, within the main memory 1103 and/or within the processor 1101 during execution thereof by the computer system 1100, the main memory 1103 and the processor 1101 also constituting machine-accessible storage media. The instructions 1125 may further be transmitted or received over a network 1117 via the network interface device 1121.

The computer-readable storage medium 1123 may also be used to store data structure sets that define user identifying states and user preferences that define user profiles. Data structure sets and user profiles may also be stored in other sections of computer system 1100, such as static memory 1105.

While the computer-readable storage medium 1123 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description.

What is claimed is:
1. A computer-implemented method comprising:
receiving, by a server computer system, data from a plurality of source systems in a semiconductor manufacturing facility;

generating a prediction pertaining to a future state of the semiconductor manufacturing facility based on the data received from the plurality of source systems;

determining a recent state of the semiconductor manufacturing facility based on real-time data received from the plurality of source systems;

facilitating a comparison between the recent state that includes start and complete times of a manufacturing operation for a plurality of lots of a product being fabricated with semiconductor manufacturing equipment during the manufacturing operation and the prediction that pertains to the future state of the semiconductor manufacturing facility including predicted start and complete times of the manufacturing operation for the plurality of lots of the product for a duration of a future time horizon;

populating a prediction data model with the data received from the plurality of source systems; and populating a real time data model with the real-time data received from the plurality of source systems, wherein the prediction data model is executed to generate the prediction including predicted start and complete times of the manufacturing operation for the plurality of lots of the product for the duration of the future time horizon and the real time data model is executed based on the real-time data to generate the recent state including the start and complete times of the manufacturing operation for the plurality of lots of the product.

2. The method of claim 1, wherein facilitating the comparison comprises:
determining whether a variance between the recent state and the prediction exceeds a threshold; and
providing a notification if the variance exceeds the threshold.

3. The method of claim 1, wherein facilitating the comparison comprises:
providing the prediction and the recent state to a client if a prediction request is received.

4. The method of claim 1, further comprising:
submitting a query to the plurality of source systems, wherein the query is created based on a type of data necessary for generating the prediction.

5. The method of claim 1, further comprising:
submitting a query to the plurality of source systems, wherein the query is created based on a type of data necessary for generating the recent state of the semiconductor manufacturing facility.

6. The method of claim 1, wherein generating the prediction comprises at least one of: making calculations, forecasting, statistical prediction, trend analysis, and running simulation.

7. The method of claim 1, wherein the prediction includes a predicted state of operations of the semiconductor manufacturing facility for a duration of a time horizon, wherein the predicted state of operations include a future state of equipment in the semiconductor manufacturing facility, a quantity and composition of a product to be manufactured, and a number of operators needed by the semiconductor manufacturing facility to manufacture the product.

8. The method of claim 2, further comprising:
querying the plurality of source systems for additional data if the variance does not exceed the threshold.

9. A computer-implemented method comprising:
receiving, by a client computer, prediction data pertaining to a future state of a semiconductor manufacturing facility from a prediction server, wherein the prediction data pertaining to the future state of the semiconductor manufacturing facility includes predicted start and complete times of a manufacturing operation for a plurality of lots of a product within a fabrication process with semiconductor manufacturing equipment for a duration of a future time horizon;

receiving, by the client computer, recent state data pertaining to a recent state of the semiconductor manufacturing facility including start and complete times of the manufacturing operation for the plurality of lots of the product from the prediction server; and presenting, with a graphical user interface, the prediction data and the recent state data to a user to indicate a comparison and a variance between the prediction data and the recent state data including a comparison between a predicted start time and a predicted complete time of the manufacturing operation for at least one lot of the plurality of lots of the product with the start time and the complete time of the manufacturing operation for the at least one lot.

10. The method of claim 9, wherein presenting comprises:
generating the graphical user interface (GUI) illustrating the predicted state of the semiconductor manufacturing facility based on the prediction data;
determining whether a duration of time has ended; and
updating the GUI based on the recent state data to include the recent factory state of the semiconductor manufacturing facility if the duration of time has not ended.

11. The method of claim 9, wherein presenting comprises:
generating a report based on the prediction data and the recent state data, wherein the report provides real-time information identifying one or more alerts related to operations of the semiconductor manufacturing facility.

12. The method of claim 11, further comprising:
determining whether the report is to be updated; and
updating data in the report if the report is to be updated, wherein updating is based on the recent state data that is associated with the semiconductor manufacturing facility.

13. The method of claim 11, further comprising:
determining whether data represented in the report is to be exported; and
exporting the data in the report if the data is to be exported.

14. The method of claim 11, further comprising:
determining whether data represented in the report is to be cleared; and
clearing the data in the report if the data is to be cleared.

15. A non-transitory computer-readable storage medium comprising executable instructions to cause a processor to perform operations, the instructions comprising:
receiving, by a server computer system, data from a plurality of source systems in a semiconductor manufacturing facility;
generating a prediction pertaining to a future state of the semiconductor manufacturing facility based on the data received from the plurality of source systems;
determining a recent state of the semiconductor manufacturing facility based on real-time data received from the plurality of source systems;
facilitating a comparison between the recent state that includes start and complete times of a manufacturing operation for a plurality of lots of a product being fabricated with semiconductor manufacturing equipment during the manufacturing operation and the prediction that pertains to the future state of the semiconductor manufacturing facility including predicted start and complete times of the manufacturing operation for the plurality of lots of the product for a duration of a future time horizon;

populating a prediction data model with the data received from the plurality of source systems; and populating a real time data model with the real-time data received from the plurality of source systems, wherein the prediction data model is executed to generate the prediction including predicted start and complete times of the manufacturing operation for the plurality of lots of the product for the duration of the future time horizon and the real time data model is executed based on the real-time data to generate the recent state including the start and complete times of the manufacturing operation for the plurality of lots of the product.

16. The non-transitory computer-readable storage medium of claim 15, wherein facilitating the comparison comprises:

providing the prediction and the recent state to a client if a prediction request is received.

17. A non-transitory computer-readable storage medium comprising executable instructions to cause a processor to perform operations, the instructions comprising:

receiving prediction data pertaining to a future state of a semiconductor manufacturing facility from a prediction server, wherein the prediction data pertaining to the future state of the semiconductor manufacturing facility includes predicted start and complete times of a manufacturing operation for a plurality of lots of a product within a fabrication process with semiconductor manufacturing equipment for a duration of a future time horizon;

receiving recent state data from the prediction server; and presenting, with a graphical user interface, the prediction data and the recent state data to a user to indicate a comparison and a variance between the prediction data and the recent state data including a comparison between a predicted start time and a predicted complete time of the manufacturing operation for at least one lot of the plurality of lots of the product with the start time and the complete time of the manufacturing operation for the at least one lot, wherein the recent state data includes start and complete times of the manufacturing operation for the plurality of lots of the product.

18. A computer system comprising:

a memory; and a processor configurable by instructions stored in the memory to:

receive data from a plurality of source systems in a semiconductor manufacturing facility;

generate a prediction pertaining to a future state of the semiconductor manufacturing facility based on the data received from the plurality of source systems;

determine a recent state of the semiconductor manufacturing facility based on real-time data received from the plurality of source systems;

facilitate a comparison between the recent state that includes start and complete times of a manufacturing operation for a plurality of lots of a product being fabricated with semiconductor manufacturing equipment during the manufacturing operation and the prediction that pertains to the future state of the semiconductor manufacturing facility including predicted start and complete times of the manufacturing operation for the plurality of lots of the product for a duration of a future time horizon;

populate a prediction data model with the data received from the plurality of source systems; and populate a real time data model with the real-time data received from the plurality of source systems, wherein the prediction data model is executed to generate the prediction including predicted start and complete times of the manufacturing operation for the plurality of lots of the product for the duration of the future time horizon and the real time data model is executed based on the real-time data to generate the recent state including the start and complete times of the manufacturing operation for the plurality of lots of the product.

19. The computer system of claim 18, wherein the processor is further configurable to:

determine whether a variance between the recent state and the prediction exceeds a threshold; and provide a notification if the variance exceeds the threshold.

* * * * *